US010235473B2

(12) United States Patent
Chagalakondu et al.

(10) Patent No.: US 10,235,473 B2
(45) Date of Patent: Mar. 19, 2019

(54) METHODS AND SYSTEMS TO ALLOCATE LOGICAL DISK COSTS TO VIRTUAL MACHINES IN A VIRTUAL DATA CENTER

(71) Applicant: VMWARE, INC., Palo Alto, CA (US)

(72) Inventors: Gurusreekanth Chagalakondu, Bangalore (IN); Mrityunjoy Saha, Bangalore (IN); Kumar Gaurav, Bangalore (IN); Ajay Gautam, Bangalore (IN); Shrisha Chandrashekar, Bangalore (IN); Hemanth Kumar Pannem, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 196 days.

(21) Appl. No.: 15/047,656

(22) Filed: Feb. 19, 2016

(65) Prior Publication Data

US 2017/0123852 A1 May 4, 2017

(30) Foreign Application Priority Data

Oct. 28, 2015 (IN) ............................ 5805/CHE/2015

(51) Int. Cl.
*G06F 12/00* (2006.01)
*G06F 17/30* (2006.01)
*G06F 9/455* (2018.01)
*G06Q 10/00* (2012.01)

(52) U.S. Cl.
CPC .... *G06F 17/30958* (2013.01); *G06F 9/45558* (2013.01); *G06Q 10/00* (2013.01); *G06F 2009/45579* (2013.01)

(58) Field of Classification Search
CPC combination set(s) only.
See application file for complete search history.

(56) References Cited

U.S. PATENT DOCUMENTS

| 7,499,968 | B1* | 3/2009 | Alexander | G06Q 10/06 |
| | | | | 705/412 |
| 8,799,897 | B2* | 8/2014 | Katiyar | G06F 9/45533 |
| | | | | 718/1 |
| 2010/0070978 | A1* | 3/2010 | Chawla | G06F 9/5077 |
| | | | | 718/105 |
| 2012/0311292 | A1* | 12/2012 | Maniwa | G06F 3/061 |
| | | | | 711/170 |
| 2013/0179648 | A1* | 7/2013 | Yagame | G06F 3/0604 |
| | | | | 711/156 |
| 2014/0325149 | A1* | 10/2014 | Misra | G06F 3/0619 |
| | | | | 711/114 |

* cited by examiner

*Primary Examiner* — Diem K Cao
(74) *Attorney, Agent, or Firm* — Thomas | Horstemeyer, LLP

(57) ABSTRACT

Methods and systems allocate storage costs to virtual machines ("VMs") in a virtual data center. Methods calculate a datastore-base rate based on datastore utilized-storage capacity in each LD and each LD-base rate when the datastore utilized-storage capacity and each LD-base rate are available. Datastore total cost is calculated by multiplying the datastore-base rate by the datastore utilized-storage capacity. Methods also use graph based methods to calculate datastore-base rates when the datastore utilized-storage capacity is unknown for each LD. The datastore-base rate associated with each datastore may then be used to calculate a VM storage cost of each VM hosted by a datastore.

24 Claims, 32 Drawing Sheets

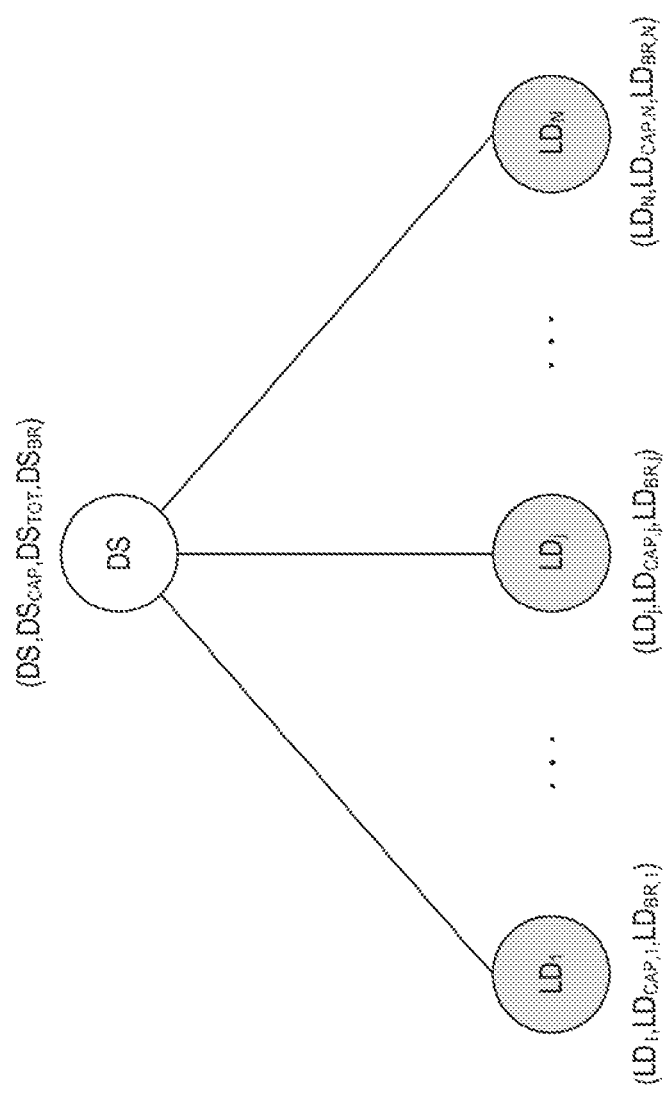

1  $\overline{DS}$ ← Set of datastores
2  $\overline{LD}$ ← Set of LDs
3  $G = (\overline{DS}, \overline{LD}, E)$ ← For each datastore DS and logical disk LD, E is a set of edges if LD is hosting datastore
4  between the datastore and the LD.
5
6  for each datastore DS in G do
7    DS (utilized capacity) ← utilized capacity of DS
8    DS (Remaining utilized capacity) ← utilized capacity of DS
9    DS (Total Cost) ← 0
10   DS (LD count) ← No. of LDs on which DS is hosted
11 end
12
13 for each LD do
14   LD (utilized capacity) ← utilized capacity of LD
15   LD (Remaining utilized capacity) ← utilized capacity of LD
16   LD (datastore count) ← No. of datastores LD is hosting
17 end

FIG. 17

```
1   flag ← true
2   while flag is true do
3       flag ← false
4
5       for each datastore DD whose DS (Remaining utilized capacity) is zero or DS (lun count) is <= 1 do
6           If DS (lun count) == 1 then
7               DS (Total Cost) ← DS (Total Cost) + DS (Remaining utilized capacity) * LD (Base Rate)
8               LD (Remaining utilized capacity) ← LD (Remaining utilized capacity) - DS (Remaining utilized capacity)
9           end
10          flag ← true
11          G ← G − {DS}
12      end
13
14      for each LD whose LD (Remaining utilized capacity) is zero or LD (datastore count) is <= 1 do
15          If LD (datastore count) == 1 then
16              DS(Total Cost) ← DS(Total Cost) + LD(Remaining utilized capacity) * LD(Base Rate)
17              DS (Remaining utilized capacity) ← DS (Remaining utilized capacity) - LD (Remaining utilized capacity)
18          end
19          flag ← true
20          G ← G − {LD}
21      end
22  end
```

FIG. 18

1  for each datastore DS in G if DS (Remaining utilized capacity) > 0 do
2      $D_w$ ← get cluster cost in proportion to remaining utilized cost
3      DS (Total Cost) ← DS (Total Cost) + $D_w$
4  end
5  
6  for all datastores do
7      DS (Base Rate) ← DS (Total Cost) / DS (utilized capacity)
8  end

FIG. 19

METHODS AND SYSTEMS TO ALLOCATE LOGICAL DISK COSTS TO VIRTUAL MACHINES IN A VIRTUAL DATA CENTER

RELATED APPLICATIONS

Benefit is claimed under 35 U.S.C. 119(a)-(d) to Foreign application Serial No. 5805/CHE/2015 filed in India entitled "METHODS AND SYSTEMS TO ALLOCATE LOGICAL DISK COSTS TO VIRTUAL MACHINES IN A VIRTUAL DATA CENTER", on Oct. 28, 2015, by VMware, Inc., which is herein incorporated in its entirety by reference for all purposes.

TECHNICAL FIELD

Methods and systems that allocate costs of logical disks usage to virtual machines in a virtual data center are described.

BACKGROUND

In recent years, enterprises have shifted much of their computing needs from enterprise owned and operated computer systems to cloud computing providers. Cloud computing providers charge enterprises to store and run their applications in a cloud-computing facility and allow enterprises to purchase other computing services in much the same way utility customers purchase a service from a public utility. A typical, cloud-computing facility is composed of numerous racks of servers, switches, routers, and mass data-storage devices interconnected by local-area networks, wide-area networks, and wireless communications that may be consolidated into a single data center or distributed geographically over a number of data centers. Enterprises typically run their applications in a cloud-computing facility as virtual machines ("VMs") that are consolidated into a virtual data center ("VDC") also called a software defined data center ("SDDC"). A VDC recreates the architecture and functionality of a physical data center for running an enterprise's applications. For example, VDCs typically include a virtual infrastructure of logical disks ("LDs") to store data objects created by the VMs. A LD is a virtual data-storage device that provides an area of usable storage capacity on one or more physical disk drives. A LD may be described as virtual because the LD does not actually exist as a physical entity, but appears to the VMs as a physical data-storage device. Because the vast numbers of VDCs and dynamic nature of VDCs running in a typical cloud-computing facility, VDC's introduce management challenges to information technology ("IT") managers.

As the demand for data storage by VMs increases, storage utilization by VMs has become increasingly significant. In particular, determining storage cost associated with each VM in a VDC has become a significant and challenging part of determining the overall cost of each VM. As a result, IT managers seek systems and methods to determine storage cost for VMs in a VDC, that take into account the various storage capacities and capabilities of the LDs.

SUMMARY

Methods and systems calculate costs of logical disk in a virtual data center ("VDC"). Methods calculate a datastore-base rate based on datastore utilized-storage capacity in each LD and each LD-base rate when the datastore utilized-storage capacity and each LD-base rate are available. Datastore total cost is calculated by multiplying the datastore-base rate by the datastore utilized-storage capacity. Methods also calculate the datastore-base rate when the datastore utilized-storage capacity is unknown for each LD. First, a graph is created in with LDs and datastores a nodes. For each datastore hosted by a LD an edge is created between the datastore and the LD. LDs and datastores are removed when each LD and datastore is connected to less than or equal to one datastore and LD. While removing a LD from the graph, the LD total cost is assigned to the datastore hosted by the LD and the LD utilized-storage capacity is from the datastore's utilized-storage capacity. When removing a datastore from the graph, the datasore utilized-storage capacity is subtracted from the LD utilized-storage capacity of the datastore hosted by the LD. This process continues until no more logical disks or datastore can be removed from the graph. When graph clusters composed of LDs and datastores that cannot be removed, LD) total costs are assigned to the datastores in proportion to each datastores remaining utilized-storage capacity. In order to determine the datastore-base rate, the total cost is divided by the original datastore utilized-storage capacity. The datastore-base rate associated with each datastore may be used to calculate a VM storage cost of each VM hosted by a datastore.

DESCRIPTION OF THE DRAWINGS

FIGS. 13A-1.3D show examples of the four types of datastore-to-LD graphs.

FIGS. 17-19 show pseudocodes that represent a method of computing datastore-base rates and datastore total costs.

DETAILED DESCRIPTION

Figure 1:
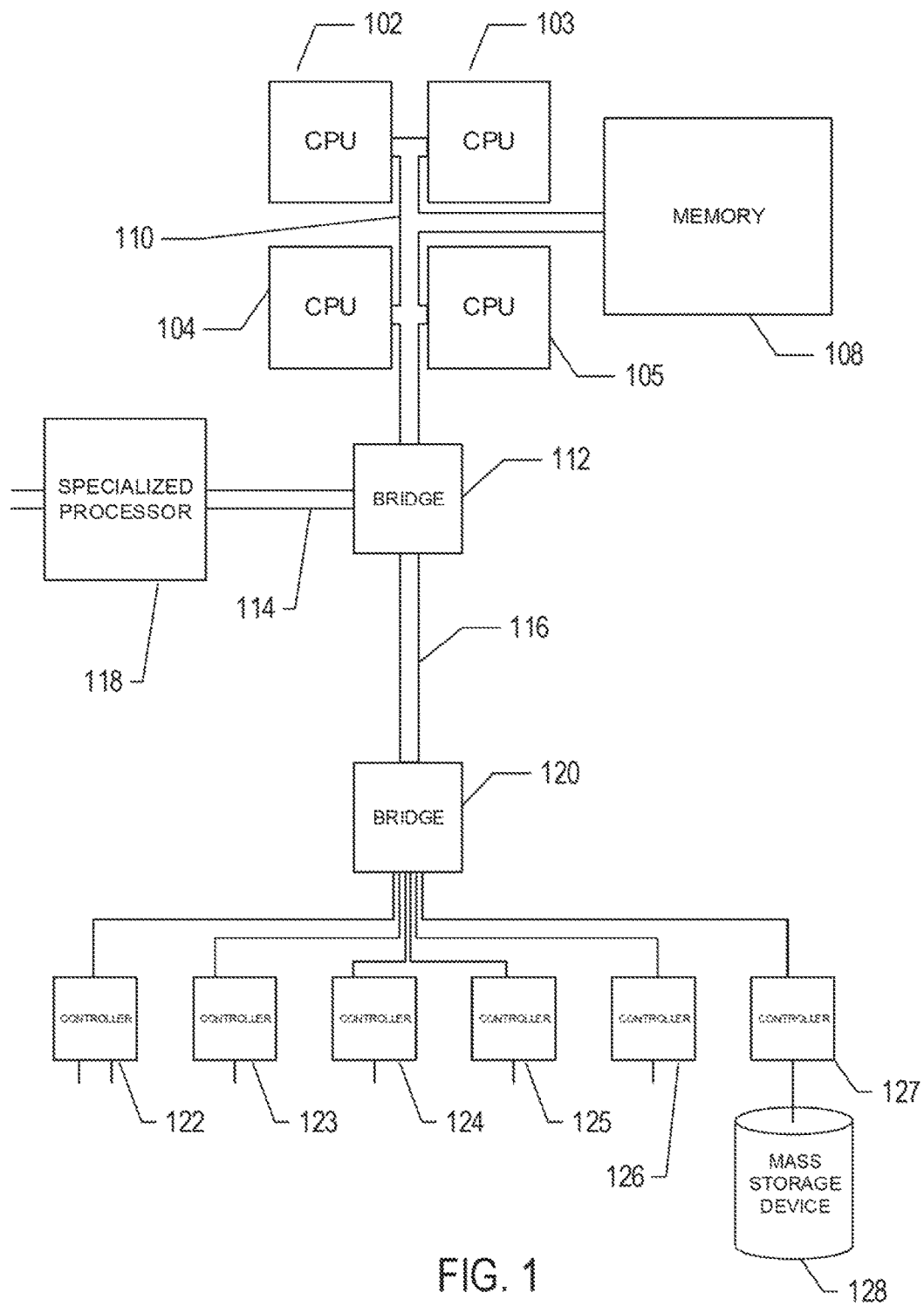
FIG. 1 shows a general architectural diagram for various types of computers.

This disclosure presents computational methods and systems to allocate storage cost to virtual machines ("VMs") in a virtual data center. Computer hard, complex computational systems, and virtualization are described in a first subsection. Methods and systems to allocate storage costs of VMs run in a virtual data center are described in a second subsection.

Computer Hardware Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the ter s "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
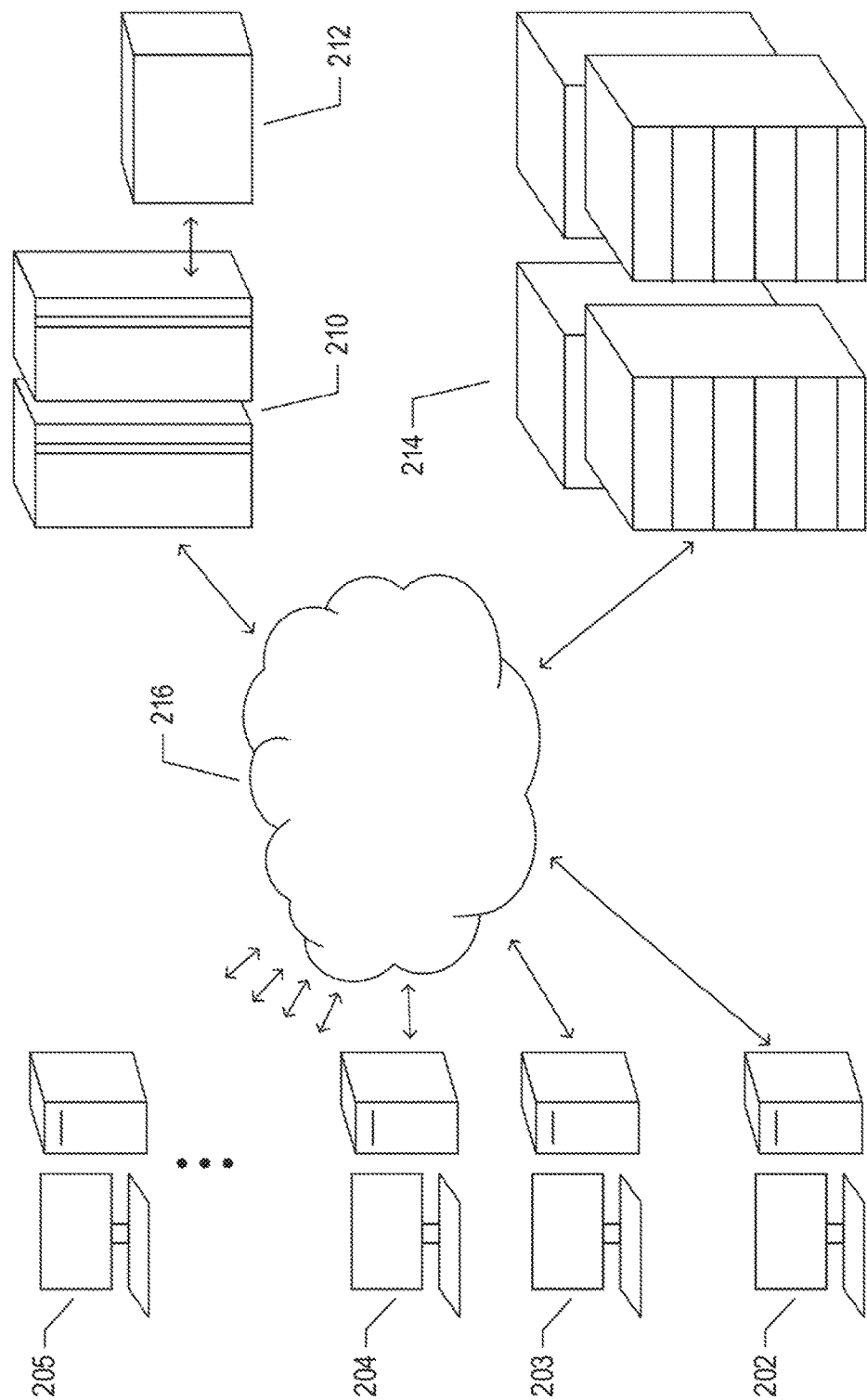
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
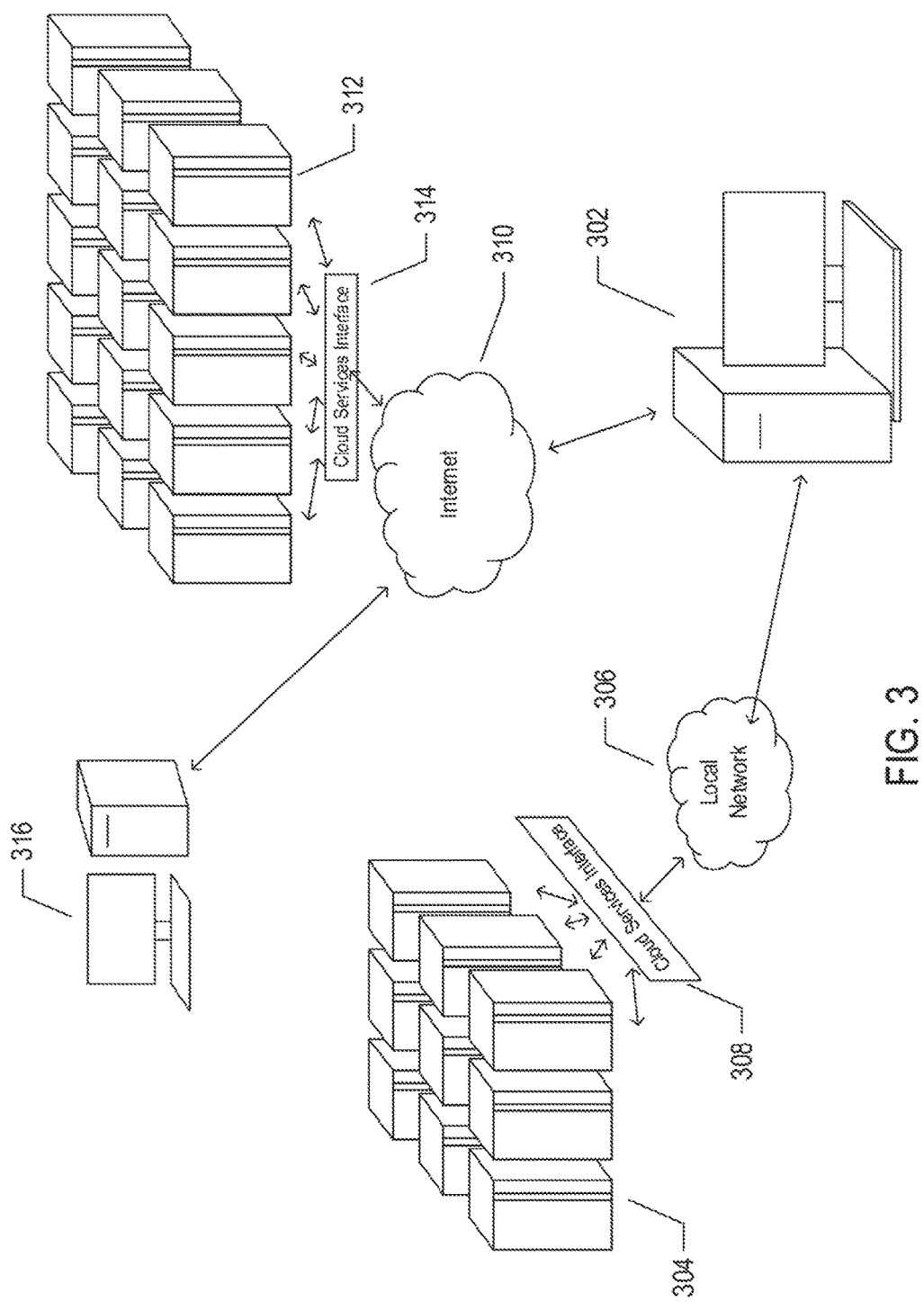
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition, to, or instead of, subscribing to computing services provided by public cloud-computing service providers. In FIG. 3, a system administrator for an organization, using a PC 302, accesses the organizations private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
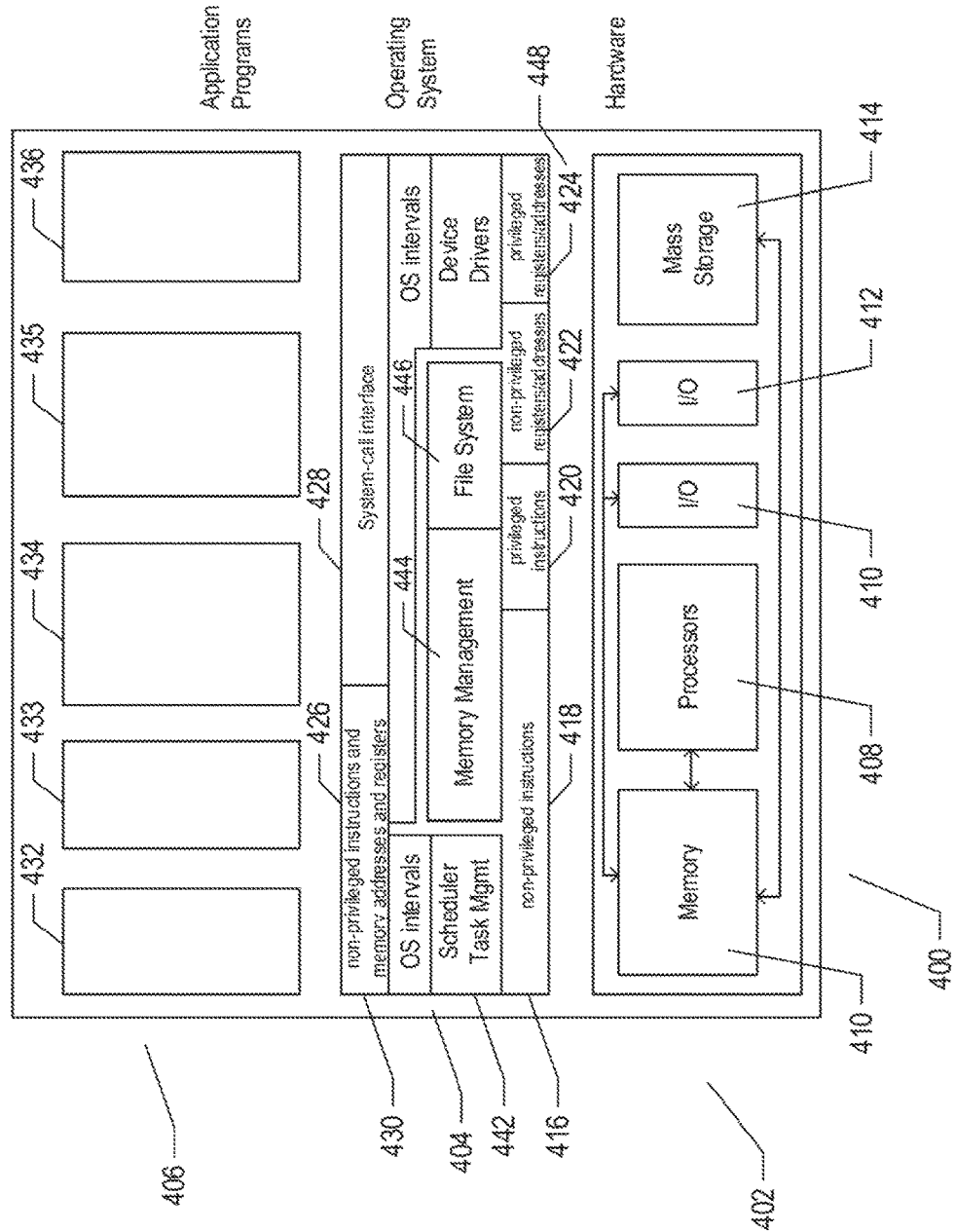
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
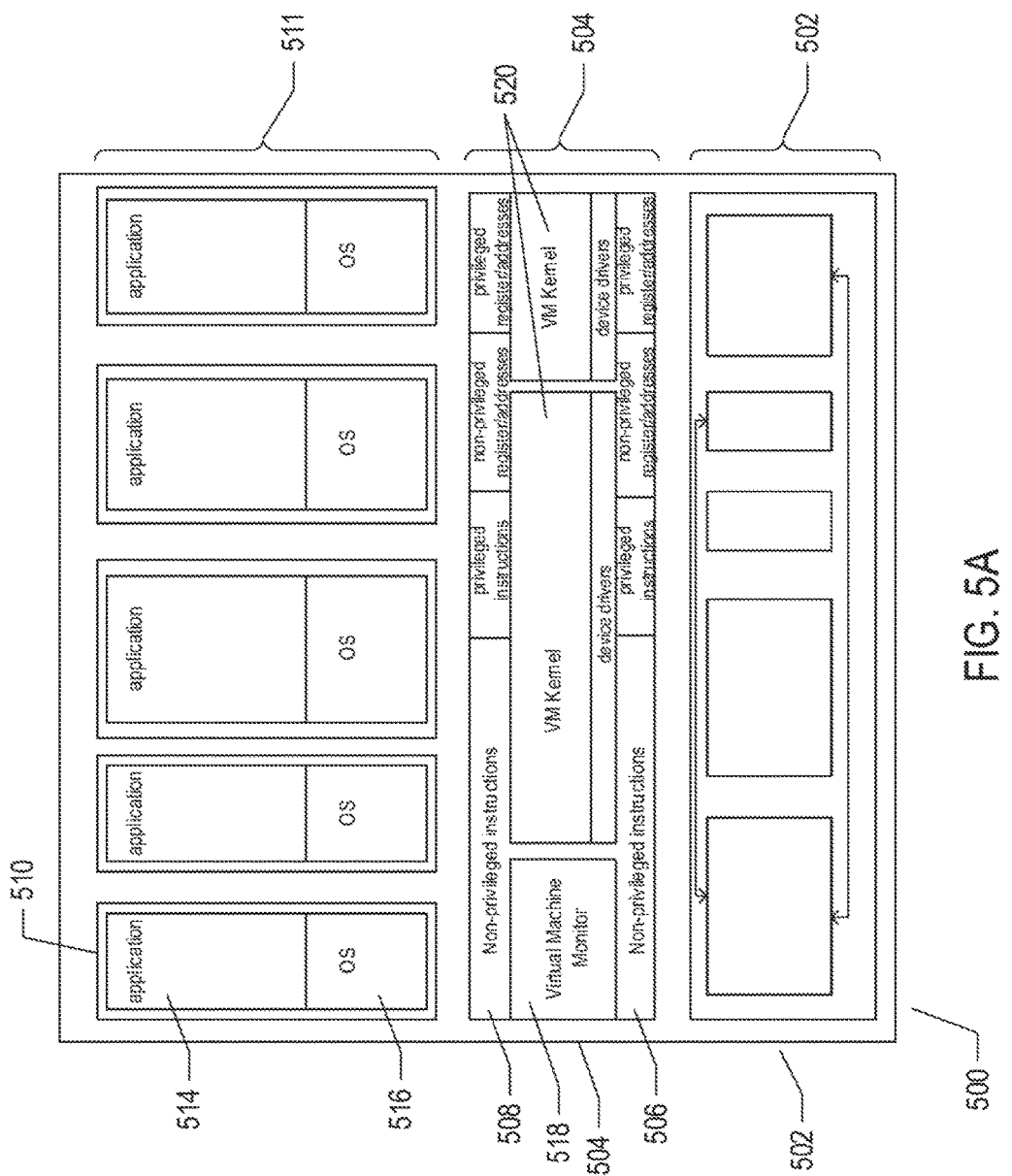
FIGS. 5A-5B show two types of virtual machine and virtual-machine execution environments.
Figure 5B:
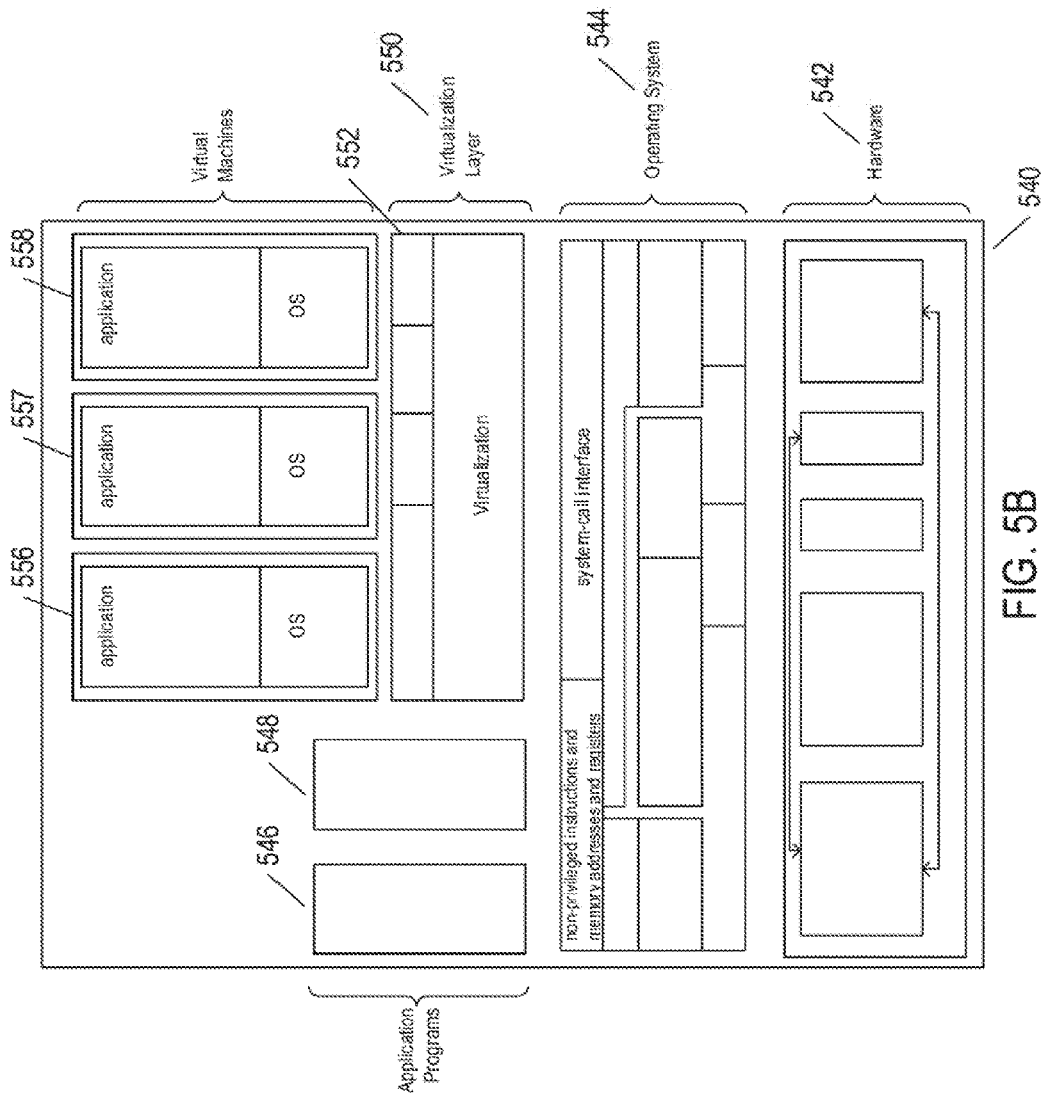

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
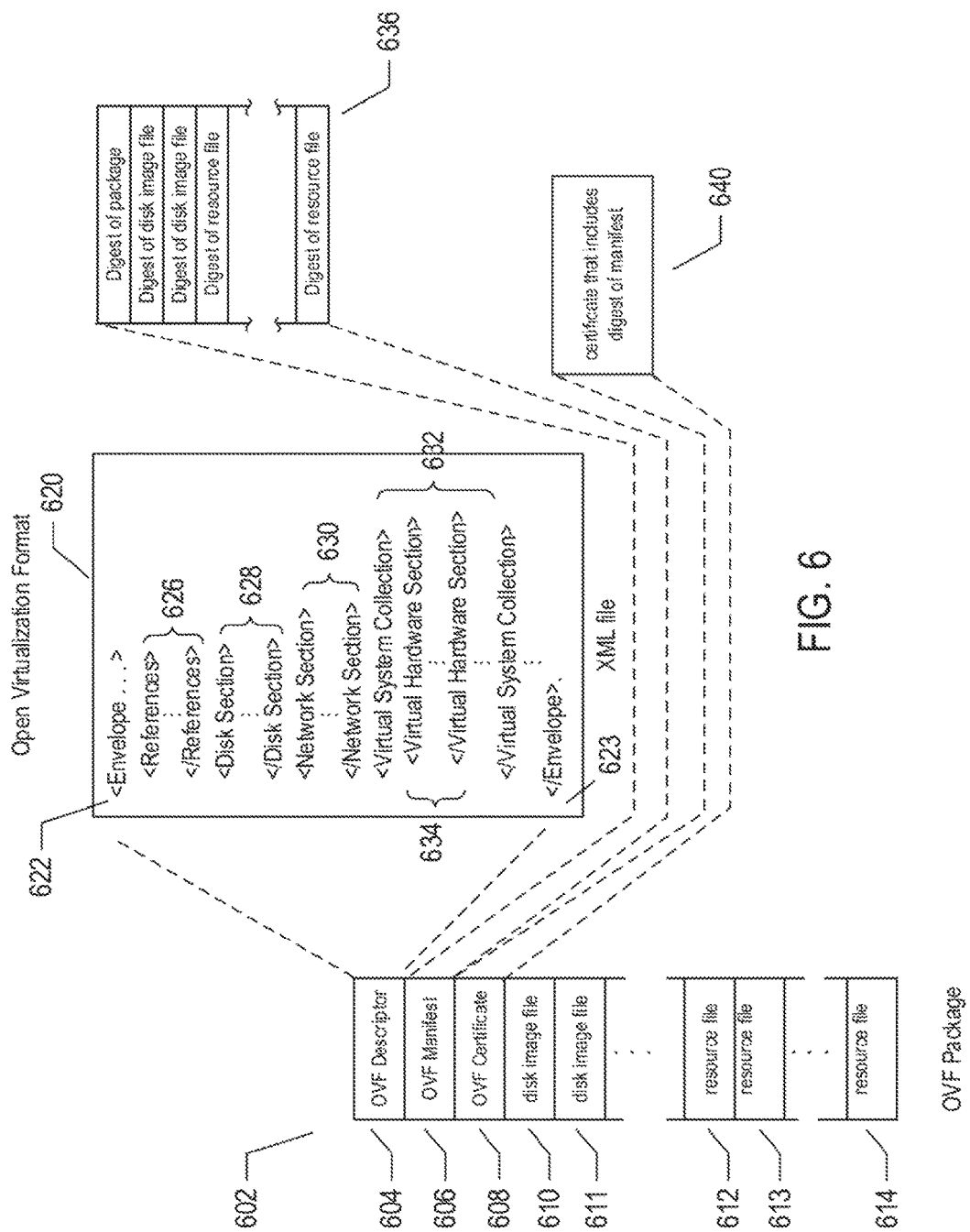
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the logical disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of logical disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
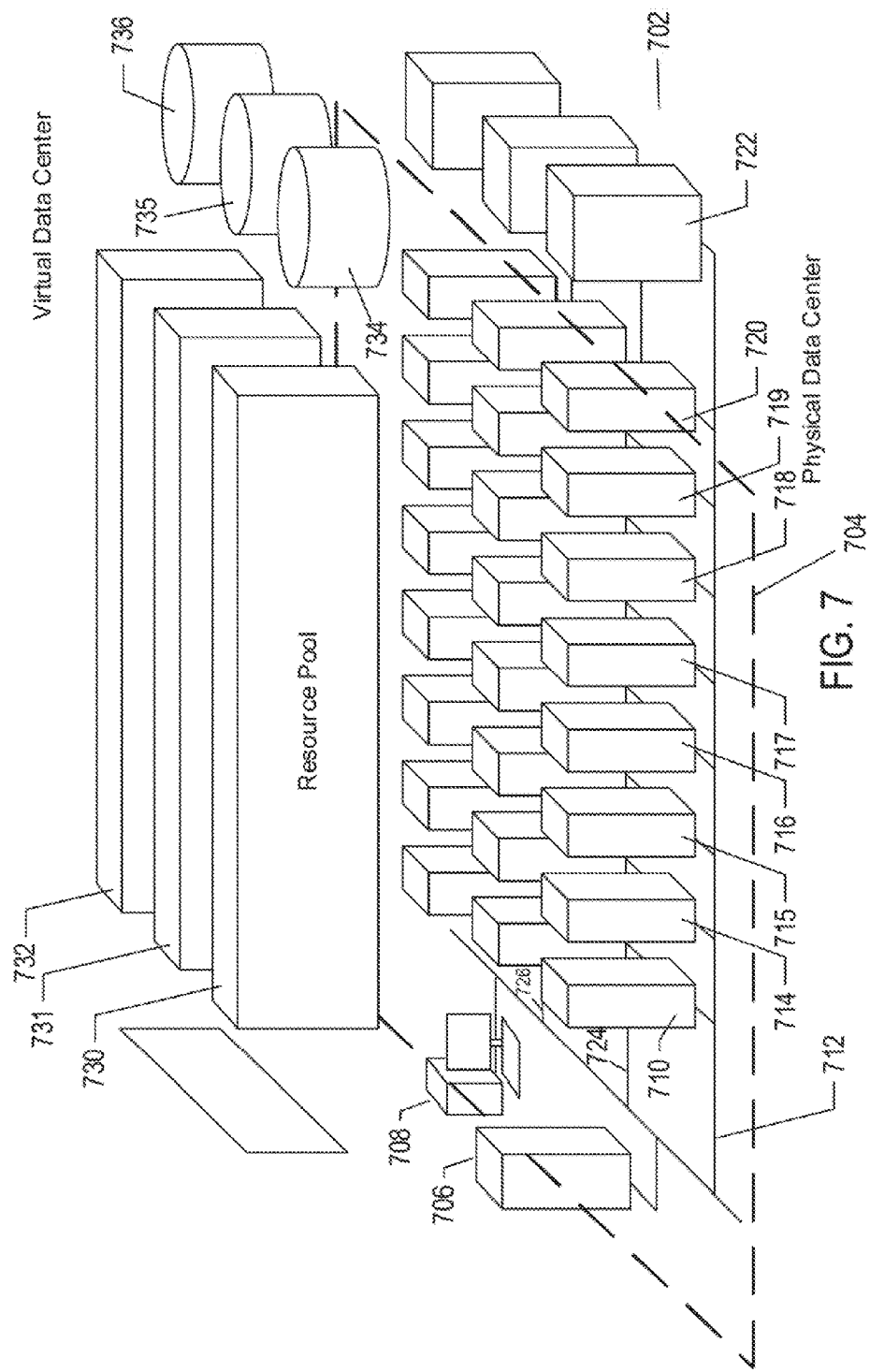
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
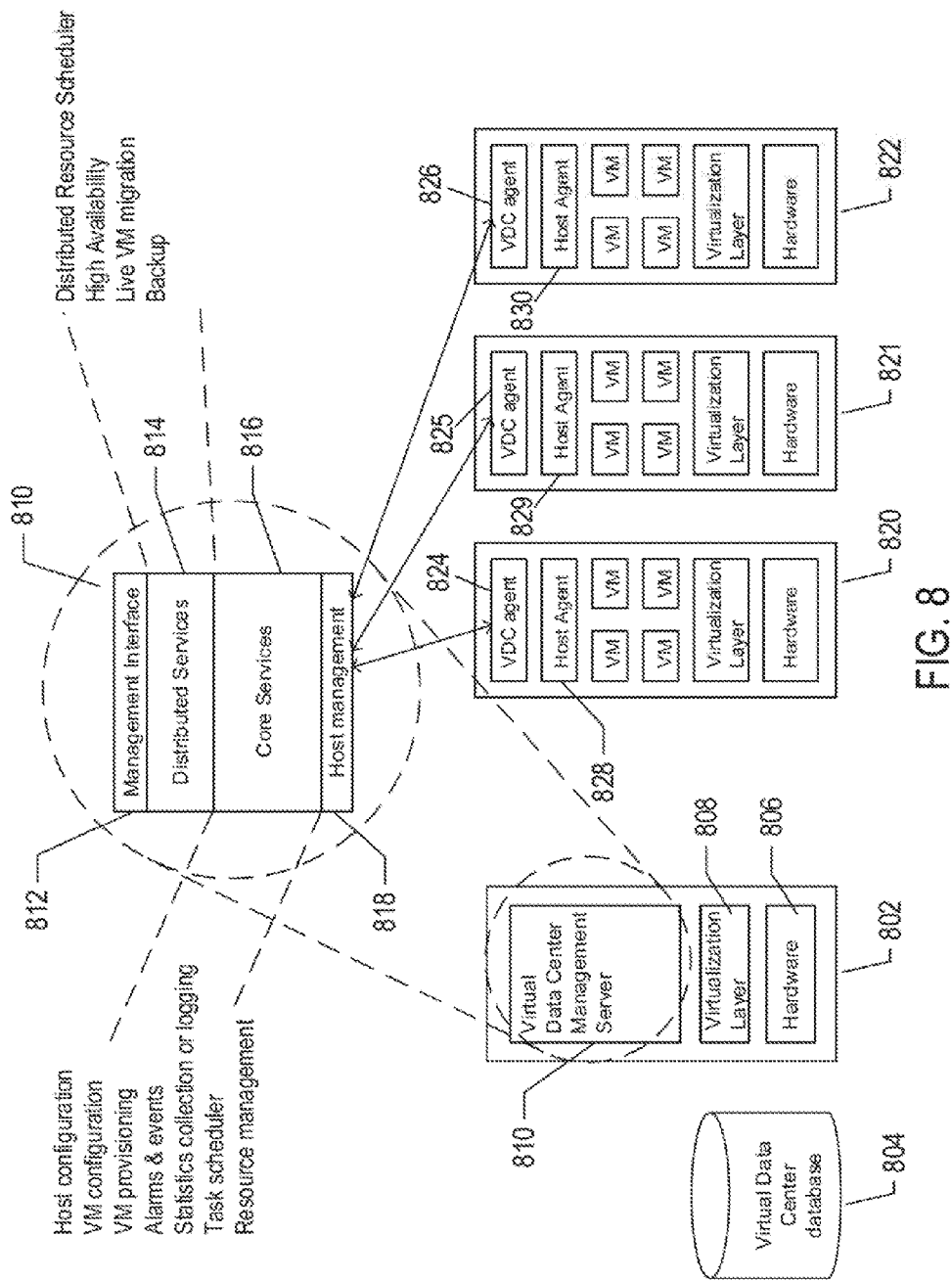
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VI 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
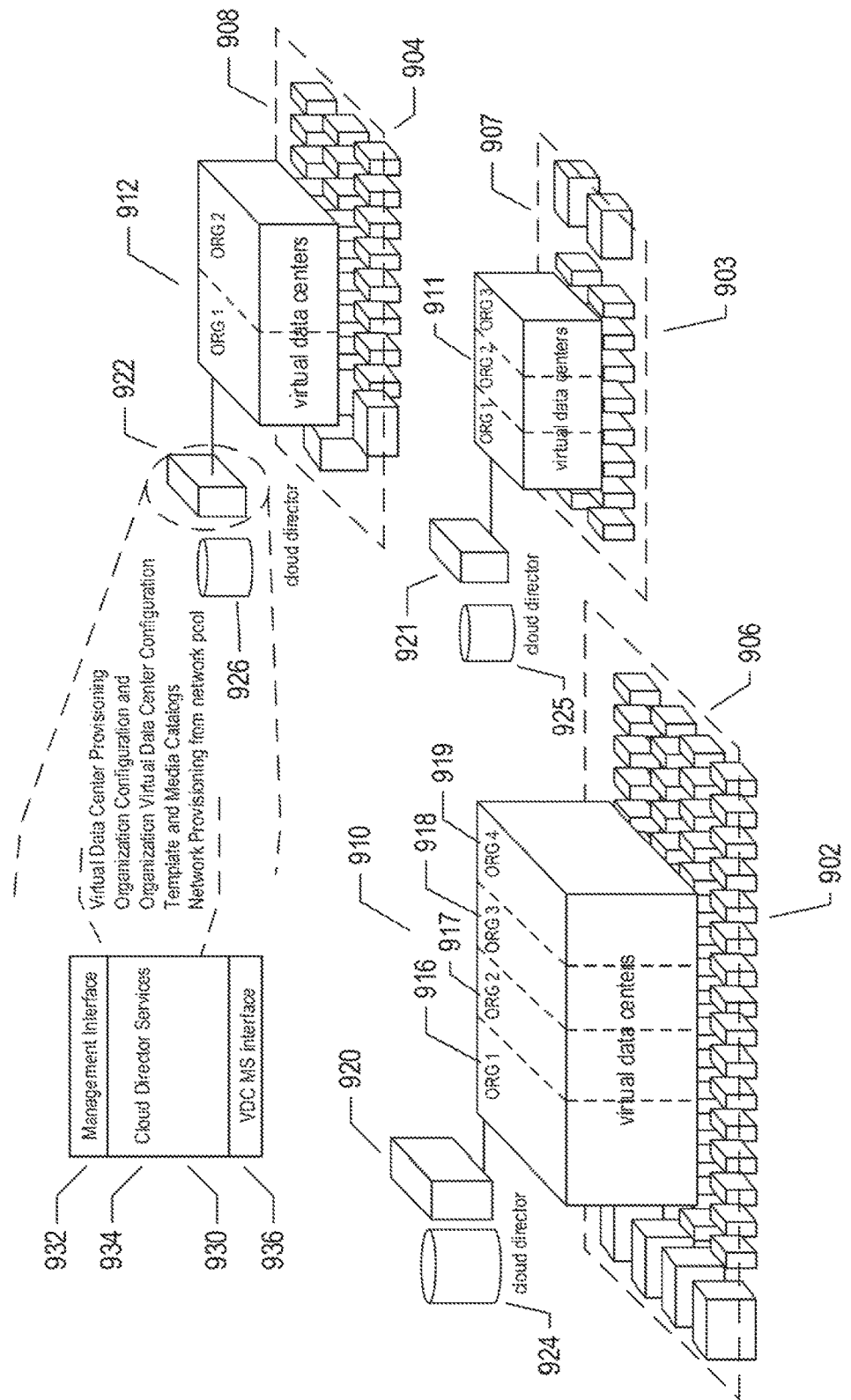
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
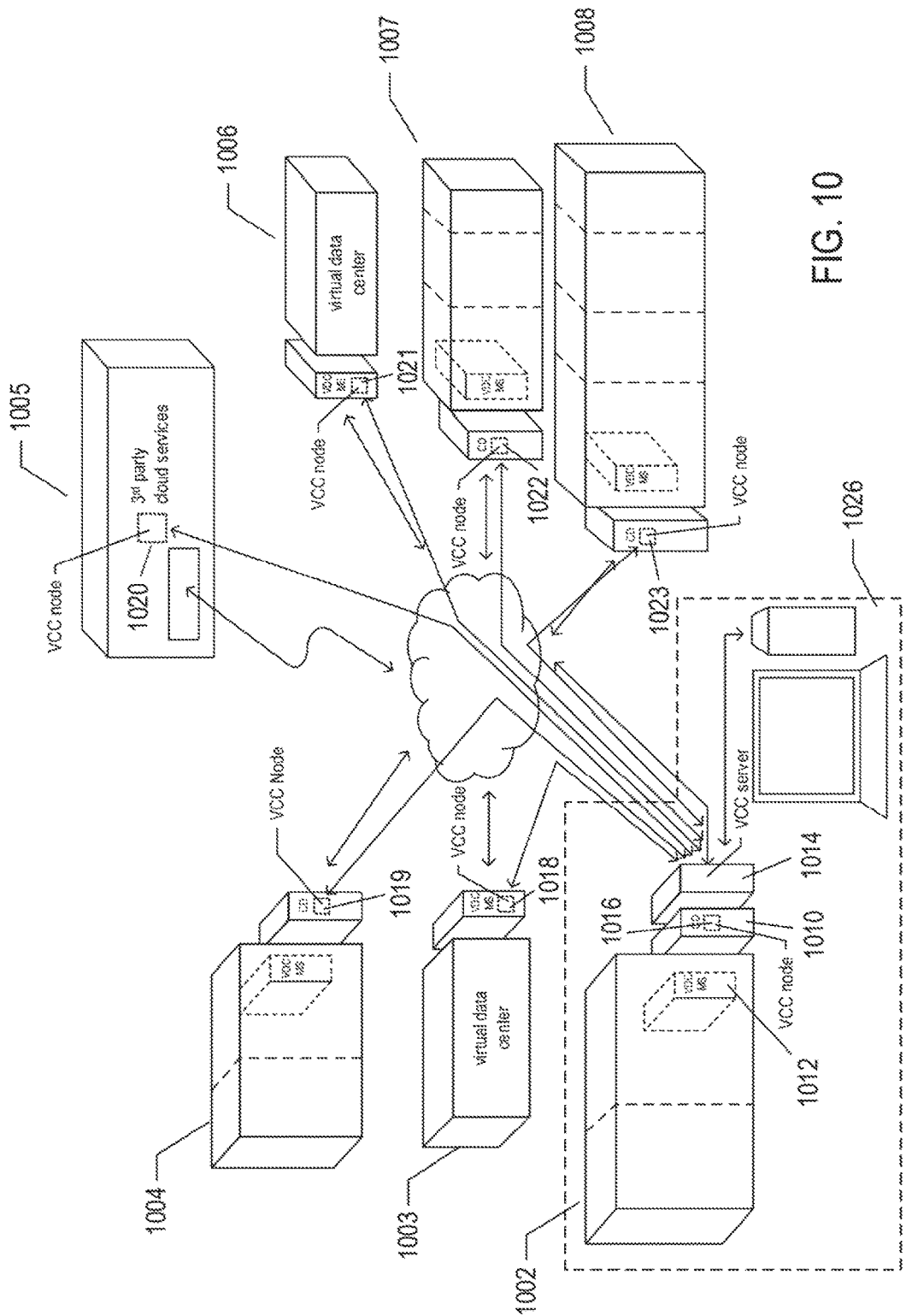
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11A:
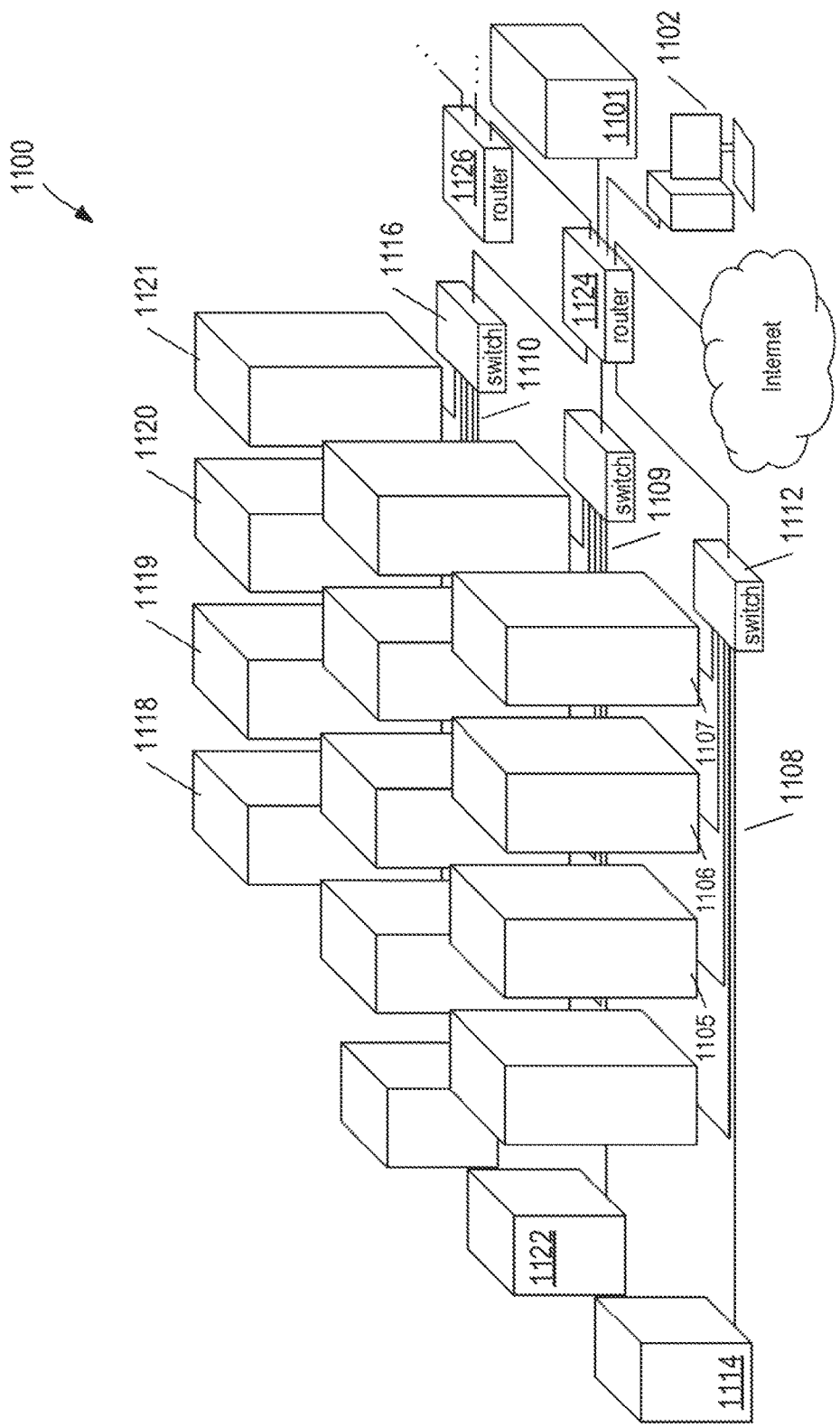
FIG. 11A shows an example of a physical data center.

Methods to Compute Storage Costs of Virtual Machines Run in a Virtual Data Center FIG. 11A shows an example of a physical data center 1100. The physical data center 1100 consists of a virtual-data-center management server 1101 and a PC 1102 on which a virtual-data-center management interface may be displayed to system administrators and other users. The physical data center 1100 additionally includes a number of hosts or server computers, such as server computers 1104-1107, interconnected to form three local area networks 1108-1110. For example, local area network 1108 includes a switch 1112 that interconnects the four servers 1104-1107 and a mass-storage array 1114 via Ethernet or optical cables and local area network 1110 includes a switch 1116 that interconnects four servers 1118-1121 and a mass-storage array 1122 via Ethernet or optical cables. In this example, the physical data center 1100 also includes a router 1124 that interconnects the LANs 1108-1110 and interconnects the LANS to the Internet, the virtual-data-center management server 1101, the PC 1102 and to a router 1126 that, in turn, interconnects other LANs composed of server computers and mass-storage arrays (not shown). In other words, the routers 1124 and 1126 are interconnected to form a larger network of server computers. A resource is any physical or virtual component of the physical data center with limited availability. For example, resources include physical CPU, memory, and storage capacity and virtual CPU ("vCPU"), memory, and storage capacity.

Figure 11B:
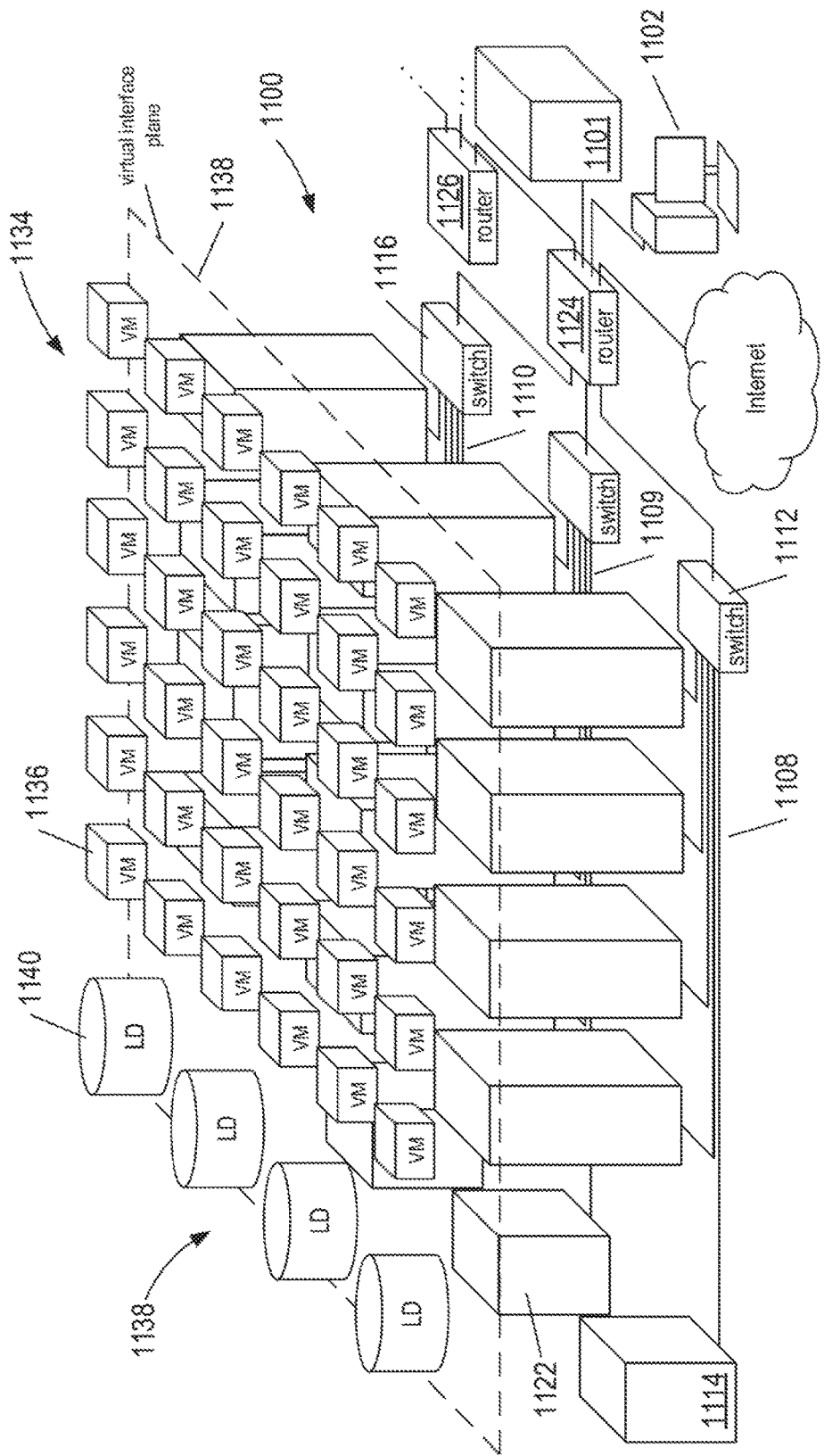
FIG. 11B shows an example set of thirty-six virtual machines ("VMs") above a virtual interface plane of the physical data center shown in FIG. 11A.

FIG. 11B shows an example of a VDC composed of a set of thirty-six VMs 1134, such as VM 1136, and four logical disks ("LDs") 1138, such as LD 1140, above a virtual interface plane 1138. LDs may also be called virtual disks. The set of VMs 1134 may be partitioned to run on different servers, and because the VMs are not bound physical devices, the VMs may be moved to different server computers in order to increase efficient use of the server computer resources within the physical data center 100 and increase computational efficiency of the VMs. For example, when demand for a VM running on one server computer increases and the server computer resources are insufficient to handle the demand, the VM may be moved to a different server computer with more resources within the physical data center 1100. Each of the LDs 1138 provides an area of storage capacity on one or more the mass-storage arrays. For example, the LD 1140 may be assigned to one of the mass-storage arrays, such as mass storage array 1122, or may be assigned to two or more partitions of two or more of the mass-storage arrays. Each of the LDs 1138 appears to the VMs 1134 as a physical data-storage device.

The VMs in the set of VMs 1134 may be contained in datastores. A datastore may be a storage location for one or more VMs and data objects, such as files, text, documents, and other types of data, created by the associated VMs. A datastore may also be block storage abstraction such as a clustered storage volume in a virtual machine monitor or another type of storage volume abstraction. A datastore is platform-independent and host-independent. As a result, datastores may not change when the VMs contained in a datastore are moved between server computers. The scope of a datastore is the physical datacenter, and each datastore is uniquely named within the physical data center. In other words, any reference to a VM or file accessed by any server computer within the physical datacenter uses a datastore path. VMs use one or more datastores to satisfy SLA requirements of applications run in the VMs. The datastores, in turn, are stored on LDs, each LD supports one or more capabilities, such as IOPS and a RAID level, to satisfy the SLA requirements for the VMs.

Figure 12:
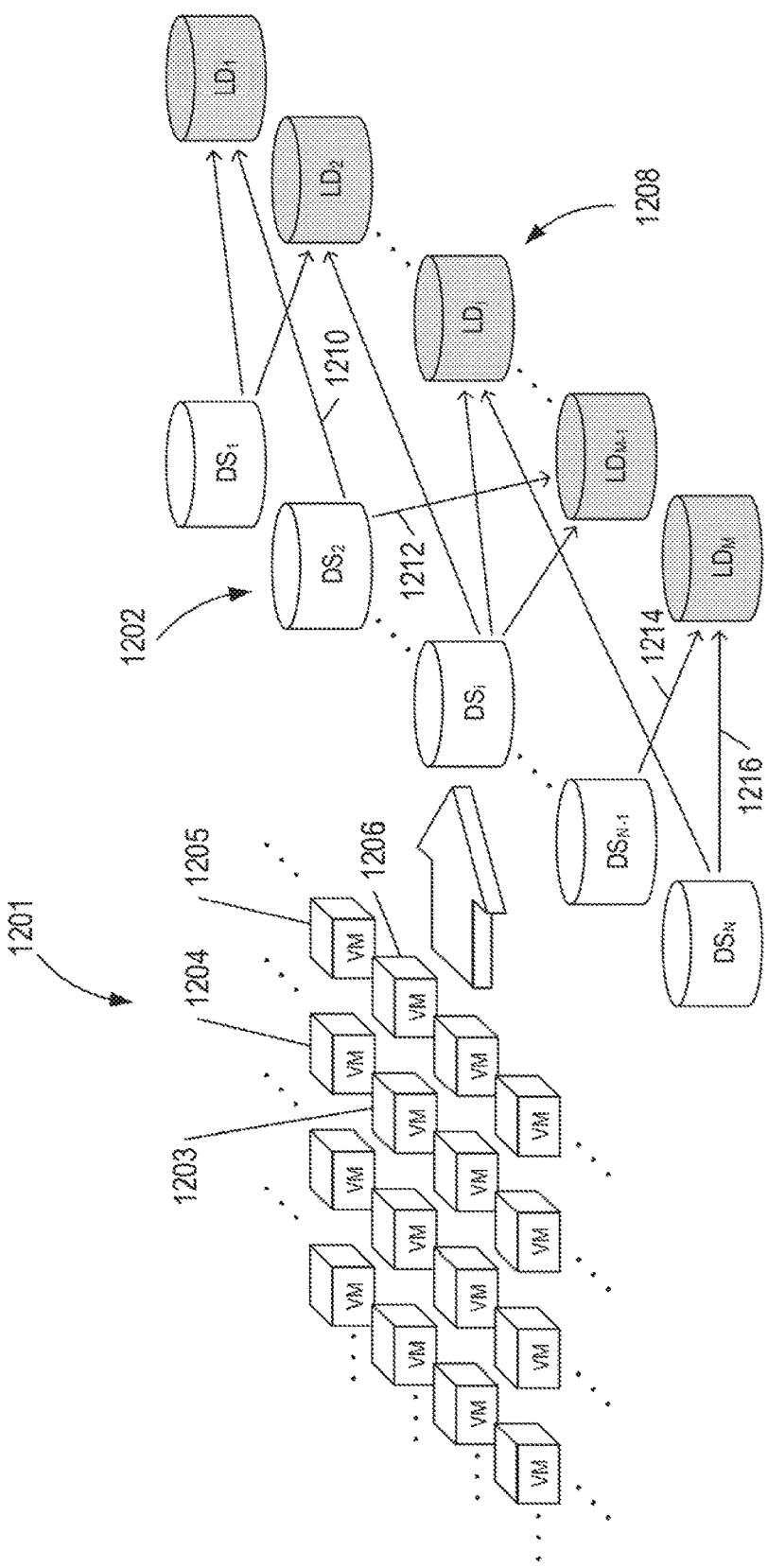
FIG. 12 shows an example of VMs created in datastores that in turn are hosted by logical disks ("LDs").

FIG. 12 shows an example of VMs 1201 created in a set of datastores denoted by $DS_i$, i=1, ..., N, where N is the number of datastores that contain the VMs. Each datastore contains one or more of the VMs 1201 and contains the data objects created by the one or more VMs. In other words, a datastore satisfies the storage requirements of a VM. For example, datastore $DS_2$ contains VMs 1203-1206 and data objects, such as files, text, and documents, created by the VMs 1203-1206. Alternatively, a VM may be created on two or more datastores. FIG. 12 also shows a set of LDs denoted by $LD_j$, j=1, ... M, where M is the number of LDs. A datastore is a VM file system formatted partition that lies either on local disk, LDs exposed by storage-area network storage or volumes exposed by network-attached storage. The datastore may be stored in, or is said to be hosted by, one or more of the LDs, as indicated by directional arrows. For example, directional arrows 1210 and 1212 represent the datastore $DS_2$ hosted by $LD_1$ and $LD_{M-1}$. Alternatively, two or more datastores may be hosted by a single LD. For example, directional arrows 1214 and 1216 represent the datastores $DS_{N-1}$ and $DS_N$ hosted by the LD, $LD_M$.

Methods allocate the overall costs of the LDs to the datastores. In order to allocate the costs of the LDs to the datastores, storage abstractions provides how much storage capacity each datastore is using on each LD. In cases where each datastore is hosted by one LD, many datastores are hosted by a single LD, and one datastore is hosted by many LDs, the datastore-base rate and total cost can be calculated from the LD-base rate. However, in cases where many datastores are hosted by many LDs, calculation of the datastore-base rates and total cost of each datastore becomes increasingly complex. Methods now described are directed to an automated process of computing a datastore-base rate and total cost for each of the datastores when datastore storage utilization data on each LD is unknown. It should be noted that the total utilized-storage capacity of all datastores is equal to a sum of utilize-storage capacities of the LDs that host the datastores.

There are four types mappings that represent the ways in which datastores may be hosted by LDs:
  One-to-one mapping between datastores and LDs;
  Many-to-one mapping of many datastores to a single LD);

One-to-many mapping of a single datastore to many LDs; and

Many-to-many mapping between many datastores and many LDs.

Bipartite graphs are constructed to represent the mappings between datastores and LDs. The datastores comprise a first set of nodes, and the LDs comprise a second set of nodes. There are no graph edges between datastores and no graph edges between LDs. Graph edges are used to represent a datastore hosted by a LD. A datastore-to-LD graph that represents datastores hosted by LDs is represented by $$G = (\overline{DS}, \overline{LD}, E) \quad (1)$$

where $\overline{DS} = \{DS_i\}_{i=1}^{N}$;

$\overline{LD} = \{LD_j\}_{j=1}^{M}$; and

E is a set of edges with each edge representing a datastore hosted by an LD.

Each LD in the set of LDs $\overline{LD}$ may be represented by a three-tuple:

$$(LD_j, LD_{CAP,j}, LD_{BR,j}) \quad (2)$$

where $LD_j$ is the name of the j-th LD in the set of LDs;

$LD_{CAP,j}$ is the utilized-storage capacity of the j-th LD; and $LD_{BR,j}$ is the LD-base rate of the j-th LD.

Each datastore in the set of datastores $\overline{DS}$ may be represented by a four-tuple:

$$(DS_j, DS_{CAP,i}, DS_{TOT,i}, D_{SBR,i}) \quad (3)$$

where $DS_i$ is the name of i-th datastore in the set of datastores $\overline{DS}$;

$DS_{CAP,i}$ is the utilized-storage capacity of the i-th datastore;

$DS_{TOT,i}$ is the total cost of the i-th datastore; and $DS_{BR,i}$ is the datastore-base rate of the i-th datastore.

Typically, the LD utilized-storage capacity and LD-base rate are known for each of the LDs in the set of LDs $\overline{LD}$. On the other hand, the datastore utilized-storage capacity is known but the datastore-base rate and datastore-total cost are typically not known for each of the datastores in the set of datastores $\overline{DS}$.

The datastore-base rate, $DS_{BR,i}$, of the associated datastore, $DS_i$, are used to calculate utilized-storage cost of the VMs hosted by the datastore $DS_i$. Suppose the datastore $DS_i$ host KVMs denoted by VM(k), where k=1, ..., K. The storage cost of the k-th VM(k) hosted by the datastore $DS_i$ is calculated as follows:

$$\text{VM storage cost}(k) = DS_{BR,i} \times VM_{STO}(k) \quad (4a)$$

where $VM_{STO}(k)$ is the amount of storage in the datastore $DS_i$ utilized by the k-th VM VM(k).

When the k-th VM is hosted by more two or more datastores, the storage cost of the k-th VM is calculated as follows:

$$\text{VM storage cost}(k) = \sum_{x=1}^{X} DS_{BR,x} \times VM_{STO,x}(k) \quad (4b)$$

where $VM_{STO,x}(k)$ is the amount of storage in the datastore $DS_x$ utilized by the k-th VM VM(k); and X is the number of datastores that host the k-th. VM.

FIGS. 13A-13D show examples of the four types of datastore-to-LD graphs that represent the four different mappings between datastores and LDs. In each graph, unshaded circles are graph nodes that represent datastores labeled according to the datastore name, and shaded circles are graph nodes that represent LDs labeled according to the LD name. For example, in FIG. 13A, unshaded circle 1301 represents a datastore node labeled $DS_i$ and shaded circle represents LD labeled $LD_j$.

Figure 13A:
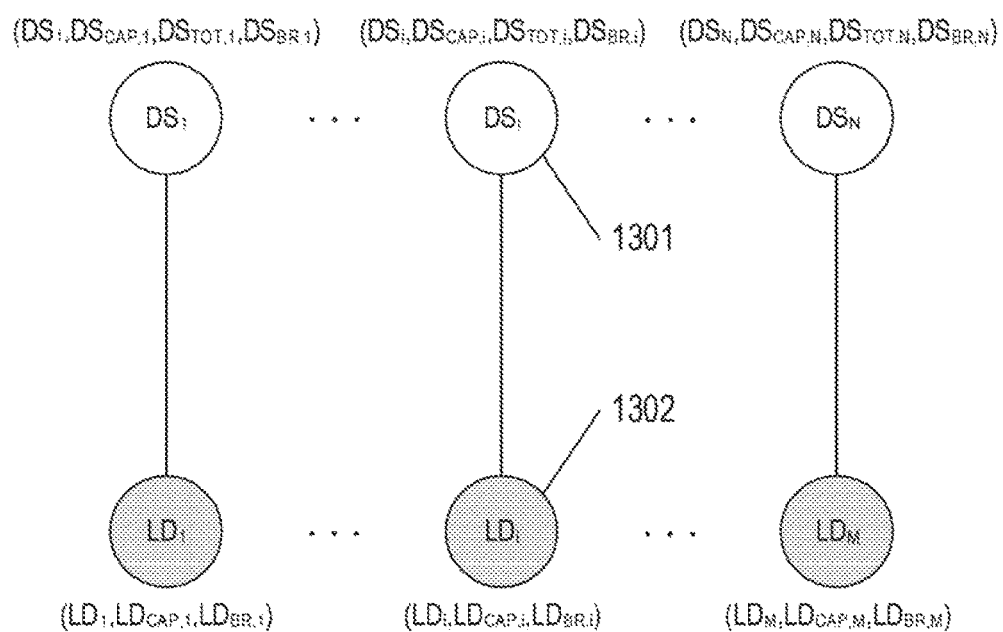

FIG. 13A shows an example datastore-to-LD graph that represents a one-to-one mapping between a set of datastores and a set of LDs. In this example, the number of datastores equals the number of LDs (i.e., M=N). Because each datastore is hosted by one LD, the datastore-base rate equals the LD-base rate of the LD. In other words, for each i=1, ..., N, $$DS_{BR,i} = LD_{BR,i} \quad (5)$$

Figure 13B:
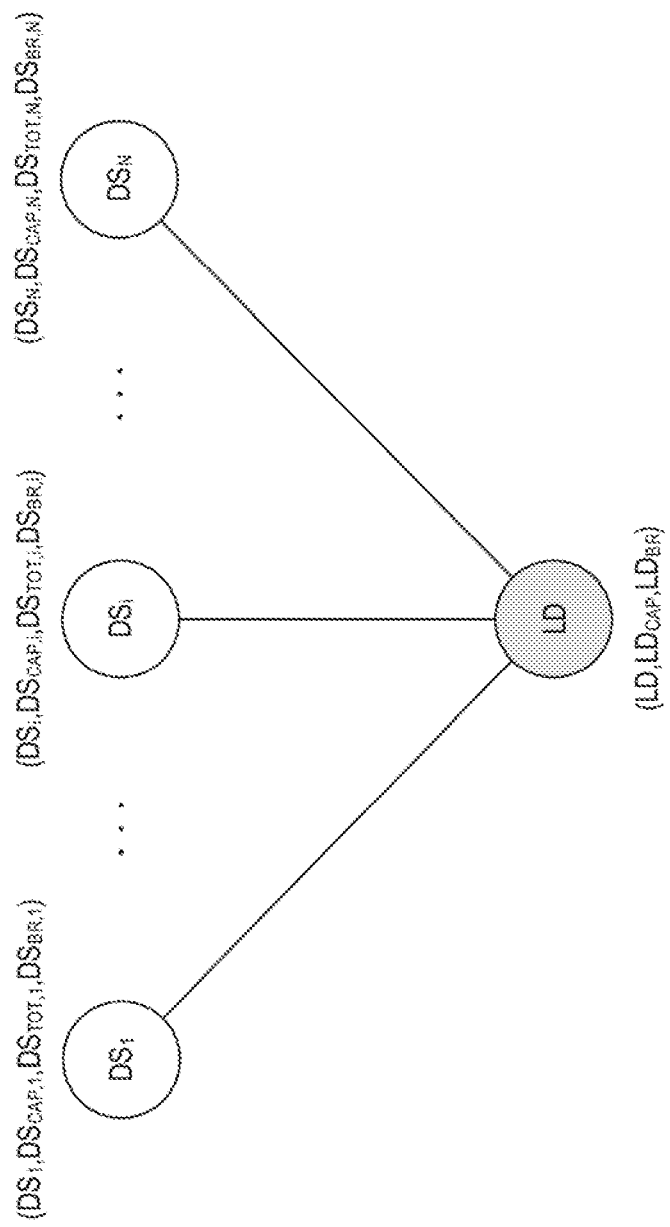

FIG. 13B shows an example datastore-to-LD graph that represents a many-to-one mapping between a set of datastores and a single LD. In this example, N datastores share data storage on a single LD. Because each datastore uses the same LD, the datastore-base rate for each of the datastores equals the LD-base rate of the single LD. In other words, for each i=1, ..., N, $$DS_{BR,i} = LD_{BR} \quad (6)$$

where $LD_{BR}$ is the LD-base rate of the single LD.

FIG. 13C shows an example datastore-to-LD graph that represents a one-to-many mapping between a single datastore and a set of LDs. In this example, the datastore-base rate, $DS_{BR}$, for a single datastore is calculated as follows:

$$DS_{BR} = \frac{\sum_{i=1}^{N}(LD_{CAP,i} \times LD_{BR,i})}{\sum_{i=1}^{N} LD_{CAP,i}} \quad (7)$$

Figure 13D:
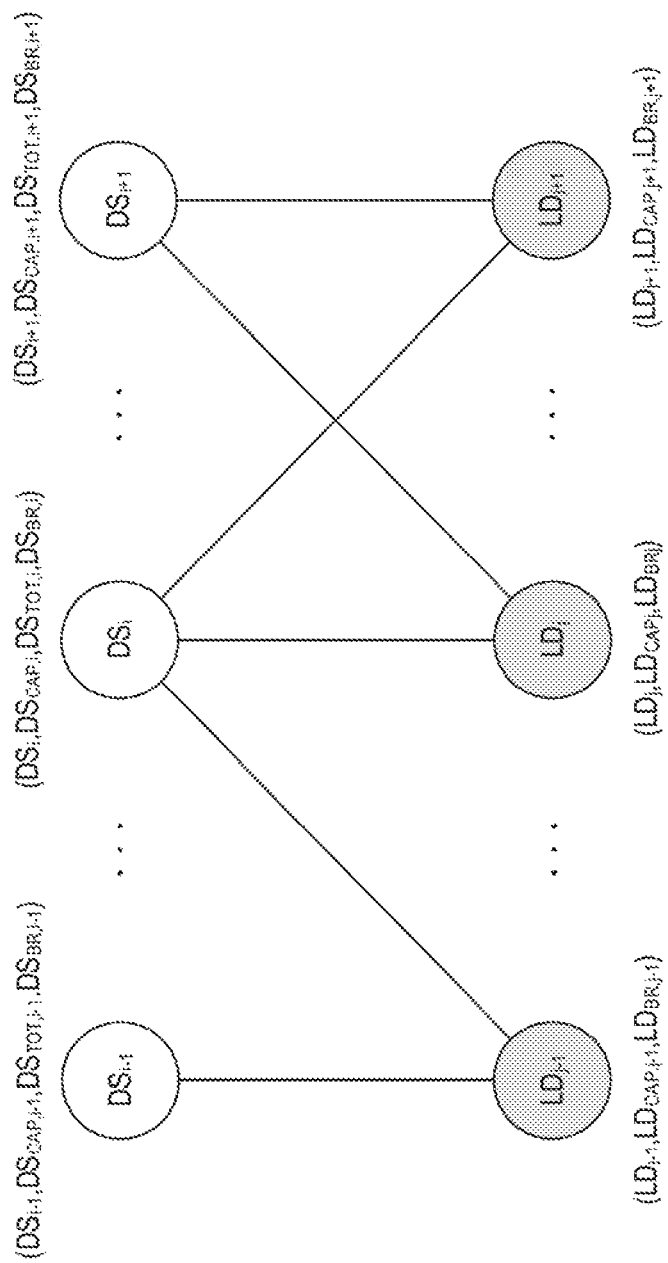

For many-to-many mappings, each datastore maybe hosted by one or more LDs, and each LD may host one or more datastores. FIG. 13D shows an example datastore-to-LD graph that represents a portion of a many-to-many mapping between a set of datastores and a set of LDs. In this example, datastore $DS_{i-1}$ is hosted by $LDLD_{j-1}$; datastore $DS_i$ is hosted by the LDs, $LD_{j-1}$, $LD_j$, and $LD_{j+1}$; and datastore $DS_{i+1}$ is hosted by the LDs, $LD_j$ and $LD_{j+1}$. A weighted average of LD-base rates and LD-storage capacities cannot be used to calculate the datastore-base rate because the amount of data stored in each LD by a datastore is not known exactly.

Methods remove a datastore node from a datastore-to-LD graph once the total cost of the datastore is calculated, and similarly, remove a LD node from the datastore-to-LD graph once the total utilization capacity of the LD is used to calculate the total cost of datastores which it is hosting.

Figure 14A:
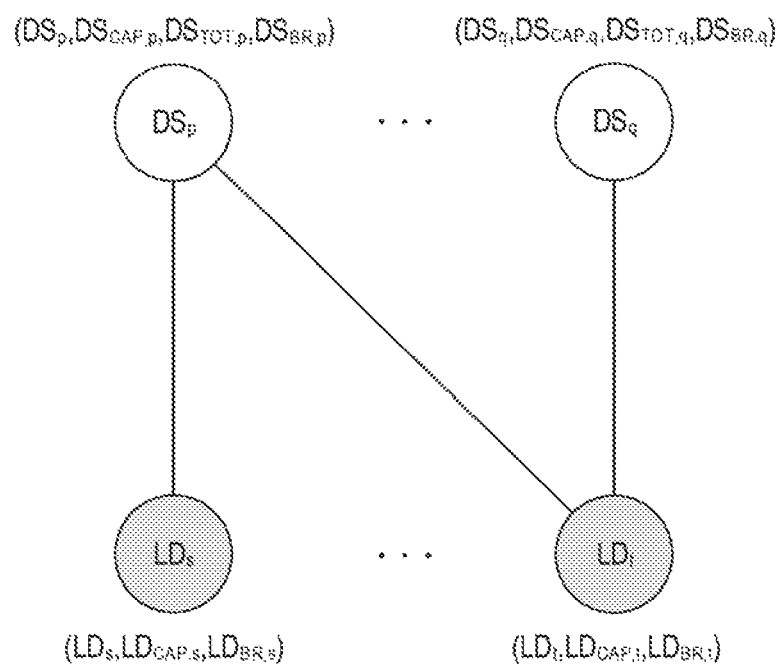
FIGS. 14A-14C shows an example of removing datastore and LD nodes from a datastore-to-LD graph.
Figure 14B:
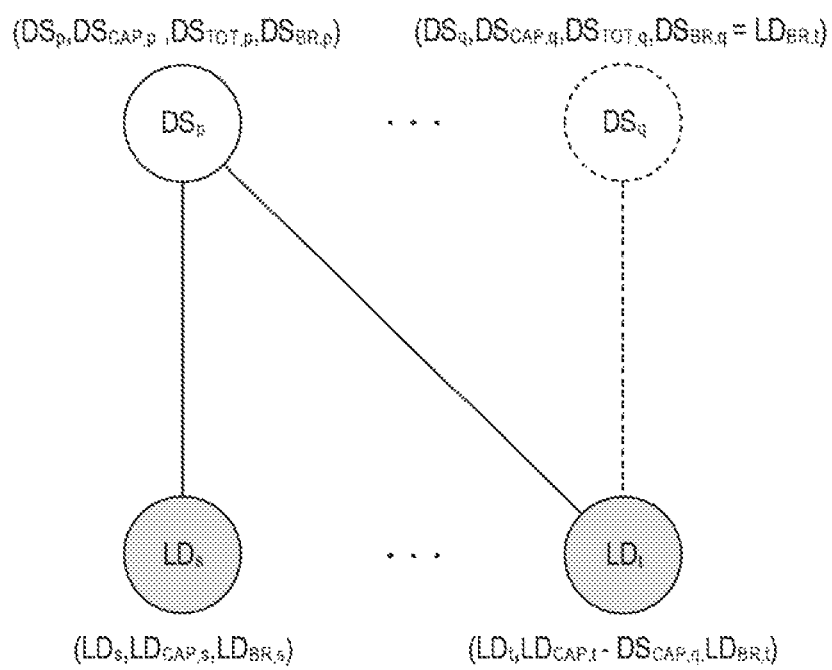
Figure 14C:
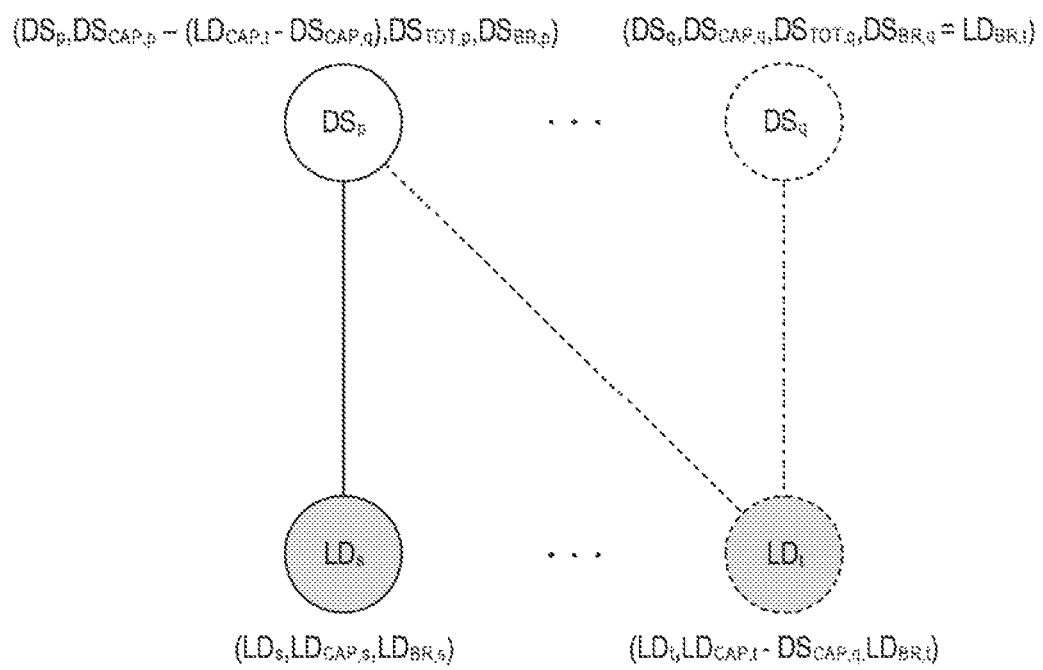

FIGS. 14A-14C shows an example of removing datastore and LD nodes from a datastore-to-LD graph. FIG. 14A shows an example datastore-to-LD graph in which a datastore $DS_p$ is hosted by two LDs, $LD_s$ and $LD_t$, and a datastore $DS_q$ is hosted by the LD, $LD_t$. In this example, the amount of data the datastore $DS_p$ has stored on the two LDs $LD_s$ and $LD_t$ is not known. But the datastore $DS_q$ stores data only on the $LDLD_t$. When the datastore $DS_q$ is hosted by the LD, the datastore $DS_q$ stores all of its data on the $LDLD_t$. As a result, the LD-base rate of the LD $LD_t$ is assigned to the datastore-base rate of datastore $DS_q$ as follows:

$$DS_{BR,q} = LD_{BR,t} \qquad (8)$$

The total cost of the datastore $DS_q$ is given by $$DS_{TOT,q} = DS_{CAP,q} \times DS_{BR,q} \qquad (9)$$

Once the datastore $DS_q$ has been assigned the total cost, the datastore $DS_q$ is removed from the graph, as represented by dashed lines in FIG. 14B, and the storage capacity, $DS_{CAP,q}$, of the datastore $DS_q$ is subtracted from the storage capacity, $LD_{CAP,t}$, of the $LDLD_t$, which gives the remaining utilized-storage capacity, $LD_{CAP,t}-DS_{CAP,q}$, to the datastore $DS_p$. The datastore $DS_p$ uses the remaining storage capacity, $LD_{CAP,t}-DS_{CAP,q}$, of the LD, $LD_t$. The LD, $LD_t$, is removed from the graph as shown in FIG. 14C, which leaves the storage capacity, $[DS_{CAP,p}-(LD_{CAP,t}-DS_{CAP,q})]$ remaining on the datastore $DS_p$ to store on the LD, $LD_s$, which has an LD-base rate $LD_{BR,s}$. As a result, the datastore-base rate of the datastore $DS_p$ is calculated as:

$$DS_{BR,p} = \frac{DS_{BR,q} \times (LD_{CAP,t} - DS_{CAP,q}) + LD_{BR,s} \times [DS_{CAP,p} - (LD_{CAP,t} - DS_{CAP,q})]}{DS_{CAP,p}} \qquad (10)$$

The total cost of the datastore $DS_p$ is given by:

$$DS_{TOT,p} = DS_{BR,q} \times (LD_{CAP,t} - DS_{CAP,q}) + LD_{BR,s} \times [DS_{CAP,p} - (LD_{CAP,t} - DS_{CAP,q})] \qquad (11)$$

The process of removing nodes from a graph is continued until no more datastore nodes or LD nodes can be removed from the graph. The resulting graph might consist of multiple disconnected sets of nodes. Each disconnected set of nodes is called a cluster. A cluster is composed of datastore and LD nodes that cannot be removed. In order to calculate a cluster cost of each of the datastores in a cluster, a total cluster cost is calculated as follows:

$$\text{Cluster cost} = \sum_{i \in cluster} (LC_{CAP,i} \times LD_{BR,i}) \qquad (12)$$

The cluster cost computed according to Equation (12) is then distributed to each of the datastores in proportion to the storage capacity of each datastore.

Figure 15:
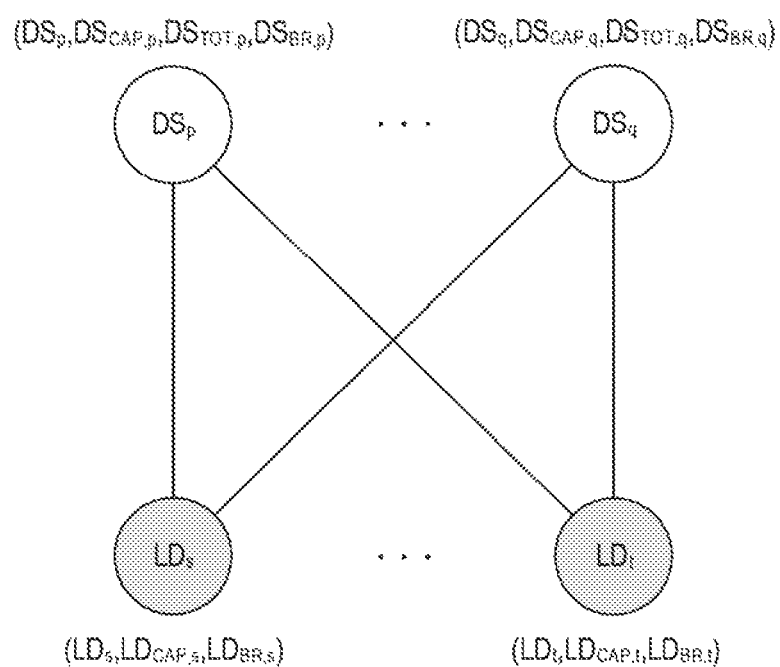
FIG. 15 shows an example datastore-to-LD graph two datastores hosted by the same two LDs.

FIG. 15 shows an example datastore-to-LD graph in which a datastore $DS_p$ is hosted by two LDs, $LD_s$ and $LD_t$, and a datastore, $DS_q$, is hosted by the same two LDs, $LD_s$ and $LD_t$. The cluster cost is calculated according to Equation (11) as:

$$\text{Cluster cost} = LD_{BR,s} \times LD_{CAP,s} + LD_{BR,t} \times LD_{CAP,t} \qquad (13)$$

The total cost of the datastore $DS_p$ is calculated by $$DS_{TOT,p} = \text{Cluster cost} \times \frac{DS_{CAP,p}}{DS_{CAP,p} + DS_{CAP,q}} \qquad (14)$$

The datastore-base rate of the datastore $DS_p$ is calculated by $$DS_{BR,p} = \frac{DS_{TOT,p}}{DS_{CAP,p}} \qquad (15)$$

The total cost of the datastore $DS_q$ is calculated by $$DS_{TOT,q} = \text{Cluster cost} \times \frac{DS_{CAP,q}}{DS_{CAP,p} + DS_{CAP,q}} \qquad (16)$$

The datastore-base rate of the datastore $DS_q$ is calculated by $$DS_{BR,q} = \frac{DS_{TOT,q}}{DS_{CAP,q}} \qquad (17)$$

Figure 16A:
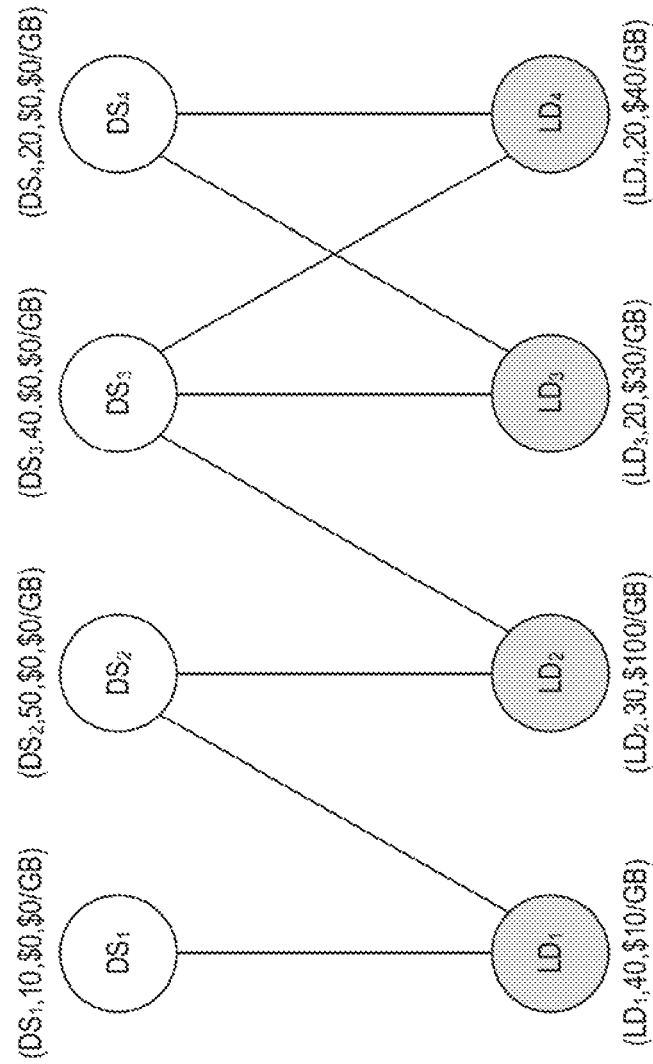
FIGS. 16A-16F show an example of determining datastore-base rates and total cost for four datastores hosted by four LDs.
Figure 16B:
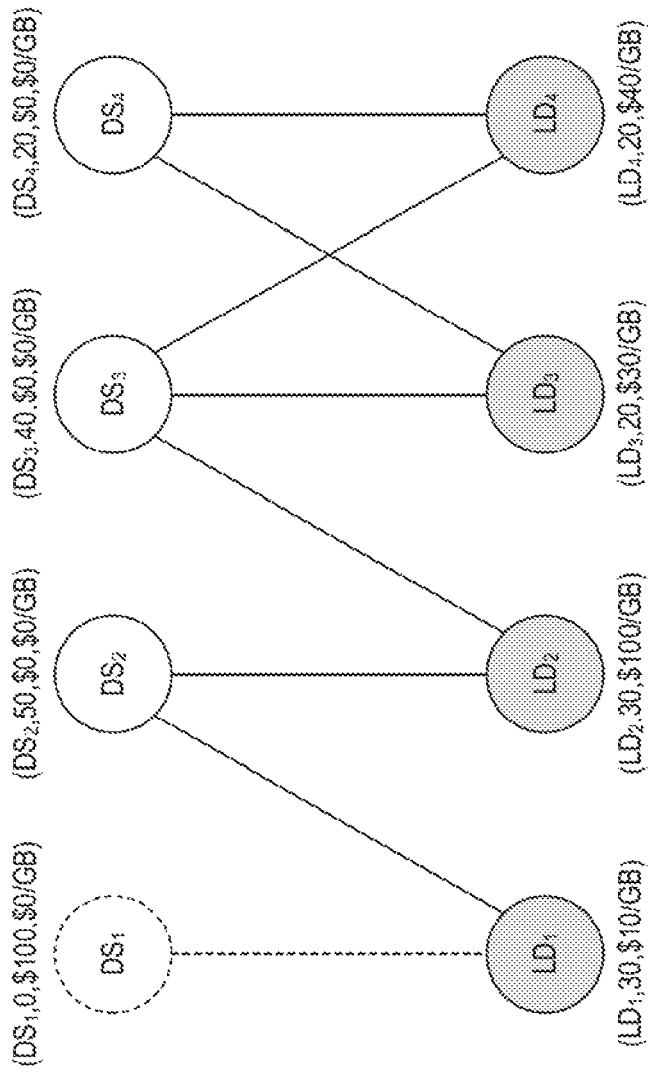

FIGS. 16A-16F shows an example of determining datastore-base rates and total cost of four datastores hosted by four LDs. FIG. 16A shows a datastore-to-LD graph of the set of datastores hosted by the set of LDs. Above each datastore node, a four-tuple identifies the datastore and represents the initial datastore utilized-storage capacities, total costs, and datastore-base rates. Below each LD node, a three-tuple identifies the LD and represents the LD utilized-storage capacities and LD-base rates. The storage capacities are in GBs, the total cost are in dollars, and the base rates are in dollars/GB.

FIG. 16A shows the initial states of the datastores and LDs and an example of a many-to-many mapping between four datastores and four LDs. The initial parameters of the datastores are summarized in the following table:

| Datastores |
| --- |
| ($DS_1$, 10, $0, $0/GB) |
| ($DS_2$, 50, $0, $0/GB) |
| ($DS_3$, 40, $0, $0/GB) |
| ($DS_4$, 20, $0, $0/GB) |

The initial parameters of the LDs are summarized in the following table:

| LDs |
| --- |
| ($LD_1$, 40, $10/GB) |
| ($LD_2$, 30, $100/GB) |
| ($LD_3$, 20, $30/GB) |
| ($LD_4$, 20, $40/GB) |

In FIG. 16A, the datastore $DS_1$ is hosted exclusively by the LD, $LD_1$. As a result, the full utilized-storage capacity of the datastore $DS_1$ is stored on the $LDLD_1$ and datastore-base rate become $10/GB. The datastore utilized-storage capacity of $DS_1$, 10 GB, is subtracted from the LD utilized-storage capacity of $LD_1$, 40 GB, to obtain the remaining utilized-storage capacity of $LD_1$, 30 GB, and the total cost of $DS_1$ is calculated as $10/GB×10 GB=$100. The parameters for $LD_1$ and $DS_1$ are updated as follows:

($DS_1$,10,$0,$0/GB)→($DS_1$,0,$100,$10/GB)

($LD_1$,40,$10/GB)→($LD_1$,30,$10/GB)

Because the remaining utilized-storage capacity of DS is zero, $DS_1$ is removed from the graph as shown in FIG. 1613B.

In FIG. 163B, the remaining utilized-storage capacity of $LD_1$, 30 GB, is used by $DS_2$. The $LD_1$ node is removed from the graph after subtracting the $LD_1$ remaining utilized-storage capacity, 30 GB, from the datastore utilized-storage capacity, 50 GB, of the datastore $DS_2$. As a result, the $DS_2$ cost of using of the remaining LD utilized-storage capacity of $LD_1$, 30 GB, is calculated by LD-base rate of $10/GB×30 GB=$300. The parameters of $LD_1$ and $DS_2$ are updated as follows:

($DS_2$,50,$0,$0/GB)→($DS_2$,20,$300,$0/GB)

($LD_1$,30,$10/GB)→($LD_1$,0,$10/GB)

Figure 16C:
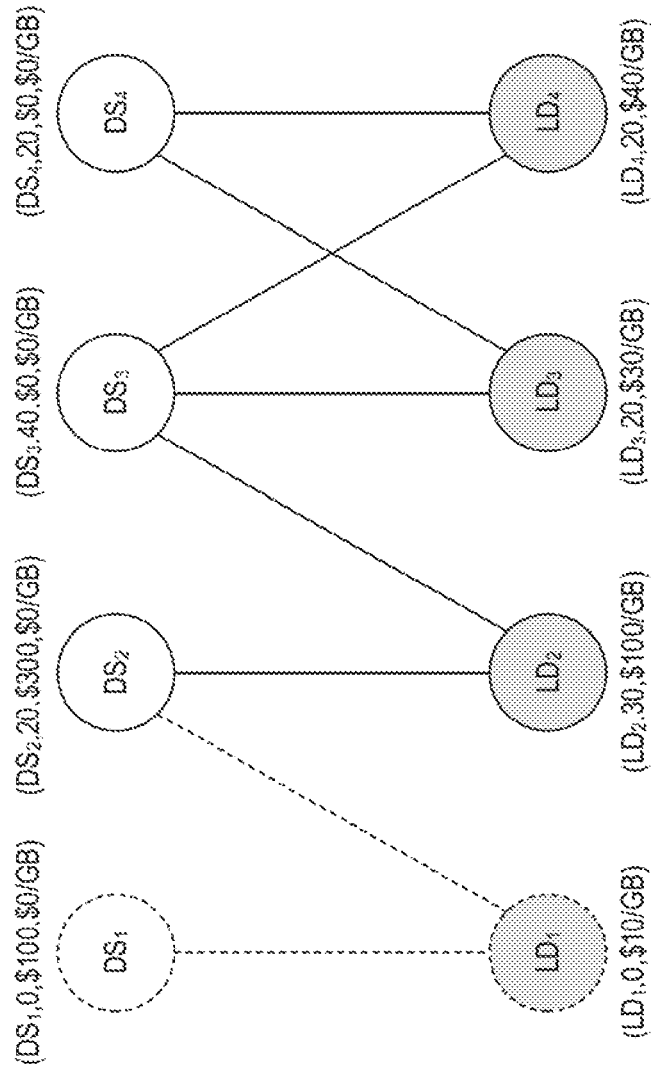

Because the remaining utilized-storage capacity of $LD_1$ is zero, $LD_1$ is removed from the graph as shown in FIG. 16C.

In FIG. 16C, because $LD_1$ has a utilized-storage capacity of 30 GB, the remaining datastore utilized-storage capacity of $DS_2$, 20 GB, is stored in $LD_2$. The LD-base rate, $100/GB, of $LD_2$ is used to calculate the cost of storing the 20 GB on $LD_2$ as $100/GB×20 GB=$2000. The datastore-base rate of $DS_2$ is calculated according to Equation (9) as follows:

$$\frac{\$10/GB \times 30GB + \$100/GB \times 20GB}{50GB} = \$46$$

The total cost of storing 50 GB of $DS_2$ on $LD_1$ and $LD_2$ is calculated according to Equation (10) as $300+$2000-$2300. The parameters for $LD_2$ and $DS_2$ are updated, as follows:

($DS_2$,20,$300,$0/GB)→($DS_2$,0,$2300,$46/GB)

($LD_2$,30,$100/GB)→($LD_2$,10,$100/GB)

Figure 16D:
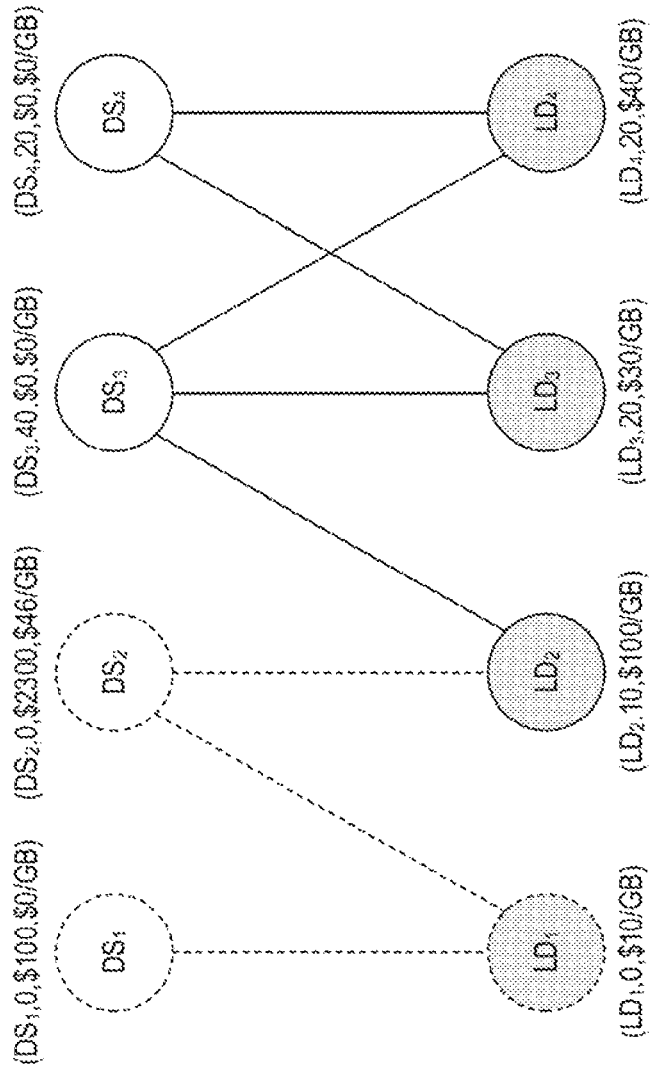

Because the datastore utilized-storage capacity of $DS_2$ is zero, the $DS_2$ node is removed from the graph as shown in FIG. 16D.

In FIG. 16D, the remaining datastore utilized-storage capacity of $LD_2$ is 10 GB which is used by $DS_3$. The remaining utilized-storage capacity 10 GB of $LD_2$ is subtracted from the datastore utilized-storage capacity 40 GB of datastore $DS_3$. As a result, the remaining LD utilized-storage capacity of $LD_2$ is zero, and the cost of storing data on $LD_2$ for $DS_3$ is calculated as $100/GB×10 GB=$1000. The parameters for $LD_2$ and $DS_3$ are updated as follows:

($DS_3$,40,$0,$0/GB)→($DS_3$,30,$1000,$50/GB)

($LD_2$,10,$100/GB)→($LD_2$,0,$100/GB)

Figure 16E:
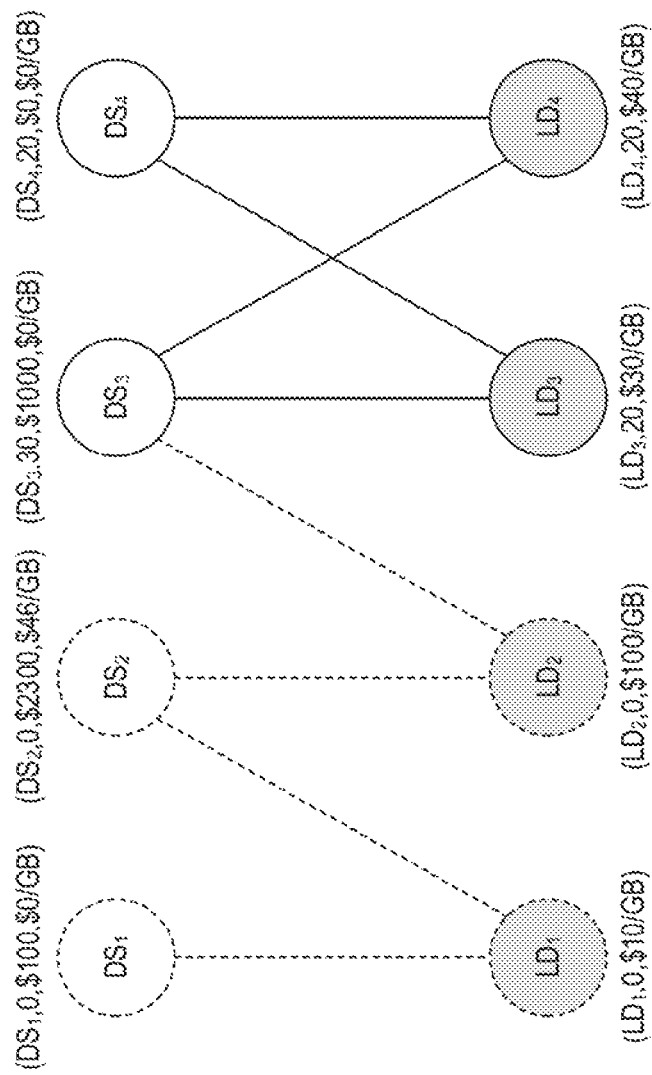

Because the LD utilized-storage capacity of $LD_2$ is zero, the $LD_2$ is removed from the graph as shown in FIG. 16E.

In FIG. 16E, the remaining datastores $DS_3$ and $DS_4$ and the remaining LDs $LD_3$ and $LD_4$ form a cluster from which nodes cannot be removed. A cluster cost is computed for the LID utilized-storage capacity of the remaining $LD_3$ and $LD_4$ as described above with reference to Equation (12):

Cluster cost=($30/GB×20 GB)+($40/GB×20 GB)=$1400

The cluster cost 1400$ is added to the datastore costs of $DS_3$ and $DS_4$ in proportion to the ratio of the remaining datastore utilized-storage capacity of $DS_3$ to the remaining datastore utilized-storage capacity of $DS_4$ as described above with reference to Equations (14) and (16). The total cost of datastore utilized-storage capacity for $DS_3$ is given by:

$$\$1000 + \$1400 \times \frac{30GB}{30GB + 20GB} = \$1840$$

The total cost of datastore utilized-storage capacity for $DS_4$ node is given by:

$$\$1400 \times \frac{20GB}{30GB + 20GB} = \$560$$

The datastore-base rate of $DS_3$ is determined by dividing the total cost $1840 by the datastore utilized-storage capacity 40 GB as follows:

$$\frac{\$1840}{40GB} = \$46/GB$$

The datastore-base rate of $DS_4$ is determined by dividing the total cost $560 by the datastore utilized-storage capacity 20 GB as follows:

$$\frac{\$560}{20GB} = \$28/GB$$

The parameters for $DS_3$ and $DS_4$ are updated as follows:

($DS_3$,10,$1000,$0/GB)→($DS_3$,0,$1840,$46/GB)

($DS_4$,20,$0,$0/GB)→($DS_4$,0,$560,$28/GB)

Figure 16F:
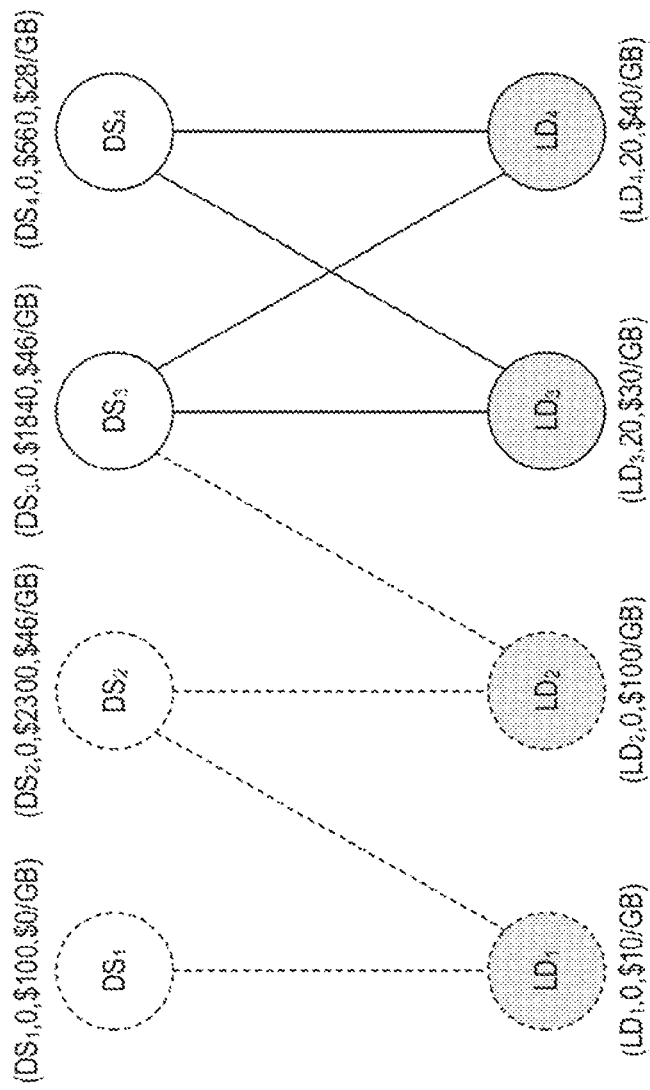

FIG. 16F shows the calculated total costs of the datastores and the datastore-base rates. Because the manner in which the datastores $DS_3$ and $DS_4$ store in the LDs $LD_3$ and $LD_4$, is unknown, the corresponding nodes are not removed from the graph. The final state of the datastores are summarized in the following table:

| Datastores |
|---|
| ($DS_1$, 0, $100, $10/GB) |
| ($DS_2$, 0, $2300, $46/GB) |
| ($DS_3$, 0, $1840, $46/GB) |
| ($DS_4$, 0, $560, $28/GB) |

FIGS. 17-19 show a pseudocodes that represent a method of computing datastore-base rates and datastore total costs. FIG. 17 shows a pseudocode that represents computing datastore and LD initial parameters. In lines 1-4, a datastore-to-LD graph composed of a set of datastores, a set of LDs, a set of edges that correspond to datastores hosted by LDs, as described above with reference to Equations (1)-(3) is created. In lines 7-10, the utilized-storage capacity, remaining storage capacity, total cost, and number LDs used to host a datastore are computed for each datastore. In lines 14-16, the utilized capacity, remaining utilized capacity, and number of datastores hosted on a LD are computed for each LD.

FIG. 18 shows a pseudocode that represents computing total cost and remaining utilized capacity of the datastores, computing remaining utilized capacity of the LDs, and removing datastores and LDs from the graph. Lines 2-22 are executed as a while loop. In line 7, the total cost of a datastore is calculated as described above with reference to FIGS. 14A-14C. In line 8, the remaining utilized capacity of a LD is calculated as a difference between remaining utilized capacity of a LD and the remaining utilized capacity of datastore. In line 12, the datastore node is removed from the set G. In line 17 the total cost of datastore is calculated a product of the remaining utilized capacity of the LD and LD-base rate and total cost of the datastore. In line 18, the remaining utilized capacity of the datastore is the difference between the remaining utilized capacity of the datastore and the remaining utilized capacity of the LD, as described above with reference FIGS. 14A-14C. In line 22, the LD node is removed from the set G.

FIG. 19 shows a pseudocode that represents computing the total cost of the datastores and the datastore-base rates. A fob-loop repeats lines 2-3 for each datastore in G that have a remaining utilized capacity greater than zero. In lines 2, the cluster cost in proportion to remaining utilized capacity is determined as described above with reference to Equations (12), (13), (14) and (16). In line 3, the cluster cost is added to the total cost. In lines 6-8 a datastore-base rate is computed for each datastore based on the associated total cost and the utilized capacity.

Figure 20:
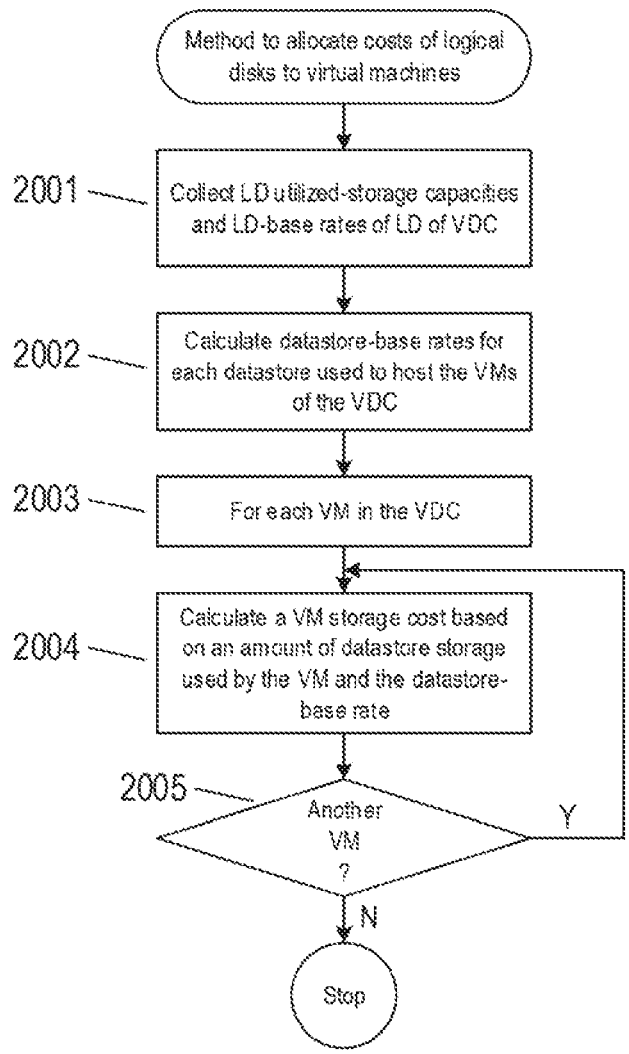
FIG. 20 shows a flow diagram of a method to allocate to allocate LD costs to VMs in a virtual data center.

FIG. 20 shows a flow diagram of a method to allocate LD costs to VMs in VDC. In block 2001, LD utilized-storage capacity and LD-base rates of each LD run in the VDC are collected as described above with reference to FIG. 12 and Equation (2). In block 2002, datastore-base rates are calculated for each of the datastores used to host the VMs as described above with reference to FIGS. 16A-16F and FIGS. 17-19. A for-loop beginning with block 2003 repeats the operation of block 2003 for each VM in the VDC. In block 2004, a VM storage cost is computed as described above with reference to Equations (4a) and (4b) based on the datastore-base rate. In decision block 2005, when all the storage cost has been calculated for each VM, the process ends. The method of claim 20 is encoded in machine-readable instructions stored on a data-storage device or other non-transitory computer-readable medium of a computer system, such as the computer system shown in FIG. 1.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computing environment to allocate logical disk ("LD") storage cost to virtual machines ("VMs"), the method comprising:
    collecting LD utilized-storage capacities and LD-base rates of LDs of a virtual data center;
    calculating a datastore-base rate for each datastore of the virtual data center based on the LD utilized-storage capacities and LD-base rates of the LDs, wherein the datastore-base rate for each datastore is calculated by dividing a total storage cost of a respective datastore across the LDs by an amount of storage utilized by the datastore across the LDs, wherein an amount of storage apportioned to at least one datastore by at least one of the LDs in the virtual data center is unknown, and the total storage cost of the respective datastore across the LDs is based on a proportion of the amount of storage utilized by the datastore across the LDs compared to other datastores utilizing the LDs; and
    for each VM, calculating a VM storage cost based on an amount of datastore storage the VM uses in the at least one datastore assigned to the VM and the datastore-base rate, wherein the amount of datastore storage used in the at least one datastore assigned to the VM comprises a total amount of data stored in the at least one datastore across the plurality of LDs.

2. The method of claim 1, wherein calculating the datastore-base rate for each datastore further comprises:
    generating a graph of the LDs and datastores, the graph having nodes that represent the LDs, nodes that represent the datastores, and edges that represent datastores hosted by LDs;
    for each datastore, calculating a datastore utilized-storage capacity and a remaining utilized-storage capacity and assigning a datastore total cost equal to zero and a datastore-LD count equal to the number of LD's on which the datastore is hosted; and
    for each LD, calculating a LD utilized-storage capacity and a LD remaining utilized-storage capacity and assigning LD-datastore count as equal to the number of datastores hosted by the LD.

3. The method of claim 2, further comprising:
    for each datastore, when a datastore utilized-storage capacity equals zero,
        if the datastore-LD count equals one,
            calculating the datastore total cost as a product of the datastore utilized-storage capacity and the LD-base rate,
            calculating the LD remaining utilized-storage capacity as the difference between the LD remaining utilized-storage capacity and the datastore remaining utilized-storage capacity, and
        removing datastore from the graph;
    for each LD, when an LD remaining utilized-storage capacity equal to zero,
        if LD datastore count equals one,
            calculating the datastore total cost as a product of the LD utilized storage capacity and the LD-base rate, and
            calculating the datastore remaining utilized-storage capacity as the difference between the LD remaining utilized-storage capacity and datastore remaining utilized storage capacity, and
        removing the LD from the graph.

4. The method of claim 3, further comprising:
    for each datastore in the graph,
        if the datastore remaining utilized-storage capacity is greater than zero,
            calculating cluster cost in proportion to remaining datastore utilized-storage costs, and
            calculating the datastore total cost based on the cluster cost; and
    for each datastore,
        calculating datastore-base rate as the datastore total cost divided by the datastore utilized-storage capacity.

5. The method of claim 1, wherein calculating the datastore-base rate further comprises for each datastore hosted by a LD, assigning the LD-base rate of the LD to the datastore-base rate.

6. The method of claim 1, wherein calculating the datastore-base rate further comprises: for a datastore hosted by two more LDs, calculating the datastore-base rate as a weighted averaged of LD-base rates of the two or more LDs.

7. The method of claim 1, wherein calculating the datastore-base rate further comprises for two or more datastores hosted by at least one LD, assigning the LD-base rate to each of the two or more datastores.

8. The method of claim 1, wherein calculating the VM storage cost further comprises:
for each VM in the virtual data center,
if the VM is hosted by one datastore,
calculating the VM storage cost as a product of an amount of storage in the datastore utilized by the VM and the datastore-base rate; and
if the VM is hosted by two or more datastores,
for each datastore that hosts the VM, calculating a VM storage cost as a product of an amount of storage utilized by the VM and the datastore-base rate, and
summing the VM storage costs to obtain a total VM storage cost.

9. A system to allocate logical disk ("LD") storage cost to virtual machines ("VMs"), the system comprising:
one or more processors;
one or more data-storage devices; and
machine-readable instructions stored in the one or more data-storage devices that when executed causes the one or more processors controls the system to carry out:
collecting LD utilized-storage capacities and LD-base rates of LDs of a virtual data center;
calculating a datastore-base rate for each datastore of the virtual data center based on the LD utilized-storage capacities and LD-base rates of the LDs, wherein the datastore-base rate for each datastore is calculated by dividing a total store cost of a respective datastore across the LDs by an amount of storage utilized by the datastore across the LDs, wherein an amount of storage apportioned to at least one datastore by at least one of the LDs in the virtual data center is unknown, and the total storage cost of the respective datastore across the LDs is based on a proportion of the amount of storage utilized by the datastore across the LDs compared to other datastores utilizing the LDs; and
for each VM, calculating a VM storage cost based on an amount of datastore storage the VM uses and the datastore-base rate, wherein the amount of datastore storage used in the at least one datastore assigned to the VM comprises a total amount of data stored in the at least one datastore across the plurality of LDs.

10. The system of claim 9, wherein calculating the datastore-base rate for each datastore further comprises:
generating a graph of the LDs and datastores, the graph having nodes that represent the LDs, nodes that represent the datastores, and edges that represent detastores hosted by LDs;
for each datastore, calculating a datastore utilized-storage capacity and a remaining utilized-storage capacity and assigning a datastore total cost equal to zero and a datastore-LD count equal to the number of LD's on which the datastore is hosted; and
for each LD, calculating a LD utilized-storage capacity and a LD remaining utilized-storage capacity and assigning LD-datastore count as equal to the number of datastores hosted by the LD.

11. The system of claim 10, further comprising:
for each datastore when a datastore utilized-storage capacity equals zero,
if the datastore-LD count equals one,
calculating the datastore total cost as a product of the datastore utilized-storage capacity and the LD-base rate,
calculating the LD remaining utilized-storage capacity as the difference between the LD remaining utilized-storage capacity and the datastore remaining utilized-storage capacity, and
removing datastore from the graph;
for each LD, when an LD remaining utilized-storage capacity equal to zero,
if LD datastore count equals one,
calculating the datastore total cost as a product of the LD utilized storage capacity and the LD-base rate, and
calculating the datastore remaining utilized-storage capacity as the difference between the LD remaining utilized-storage capacity and datastore remaining utilized storage capacity, and
removing the LD from the graph.

12. The system of claim 11, further comprising:
for each datastore in the graph,
if the datastore remaining utilized-storage capacity is greater than zero,
calculating cluster cost in proportion to remaining datastore utilized-storage costs, and
calculating the datastore total cost based on the cluster cost; and
for each datastore,
calculating datastore-base rate as the datastore total cost divided by the datastore utilized-storage capacity.

13. The system of claim 9, wherein calculating the datastore-base rate further comprises for each datastore hosted by a single LD, assigning the LD-base rate of the LD to the datastore-base rate.

14. The system of claim 9, wherein calculating the datastore-base rate further comprises for a datastore host by two more LDs, calculating the datastore-base rate as a weighted averaged of LD-base rates of the two or more LDs.

15. The system of claim 9, wherein calculating the datastore-base rate further comprises for two or more datastores hosted by one LD, assigning the LD-base rate to each of the two or more datastores.

16. The system of claim 9, wherein calculating the VM storage cost further comprises:
for each VM In the virtual data center,
if the VM is hosted by one datastore,
calculating the VM storage cost as a product of an amount of storage in the datastore utilized by the VM and the datastore-base rate; and
if the VM is hosted by two or more datastores,
for each datastore that hosts the VM, calculating a VM storage coat as a product of an amount of storage utilized by the VM and the datastore-base rate, and
summing the VM storage costs to obtain a total VM storage cost.

17. A non-transitory computer-readable medium encoded with machine-readable instructions that allocate logical disk ("LD") storage cost to virtual machines ("VMs"), the instructions executed by one or more processors of a computer system to perform the operations of:
collecting LD utilized-storage capacities and LD-base rates of LDs of a virtual data center;
calculating a datastore-base rate for each datastore of the virtual data center based on the LD utilized-storage capacities and LD-base rates of the LDs, wherein the datastore-base rate for each datastore is calculated by dividing a total storage cost of a respective datastore across the LDs by an amount of storage utilized by the datastore across the LDs, wherein an amount of storage apportioned to at least one datastore by at least one of the LDs in the virtual data center is unknown, and the total storage cost of the respective datastore across the LDs is based on a proportion of the amount of storage utilized by the datastore across the LDs compared to other datastores utilizing the LDs; and for each VM, calculating a VM storage cost based on an amount of datastore storage the VM uses and the datastore-base rate, wherein the amount of datastore storage the VM uses comprises a total amount of data stored in the at least one datastore across the plurality of LDs.

18. The non-transitory computer-readable medium of claim 17, wherein calculating the datastore-base rate for each datastore further comprises:

generating a graph of the LDs and datastores, the graph having nodes that represent the LDs, nodes that represent the datastores, and edges that represent datastores hosted by LDs;

for each datastore, calculating a datastore utilized-storage capacity and a remaining utilized-storage capacity and assigning a datastore total cost equal to zero and a datastore-LD count equal to the number of LD's on which the datastore is hosted; and for each LD, calculating a LD utilized-storage capacity and a LD remaining utilized-storage capacity and assigning LD-datastore count as equal to the number of datastores hosted by the LD.

19. The non-transitory computer-readable medium of claim 18, further comprising:

for each datastore when a datastore utilized-storage capacity equals zero,
 if the datastore-LD count equals one,
  calculating the datastore total cost as a product of the datastore utilized-storage capacity and the LD-base rate,
  calculating the LD remaining utilized-storage capacity as the difference between the LD remaining utilized-storage capacity and the datastore remaining utilized-storage capacity, and
  removing datastore from the graph;

for each LD, when an LD remaining utilized-storage capacity equal to zero,
 if LD datastore count equals one,
  calculating the datastore total cost as a product of the LD utilized storage capacity and the LD-base rate, and
  calculating the datastore remaining utilized-storage capacity as the difference between the LD remaining utilized-storage capacity and datastore remaining utilized storage capacity, and
 removing the LD from the graph.

20. The non-transitory computer-readable medium of claim 19, further comprising:

for each datastore in the graph,
 if the datastore remaining utilized-storage capacity is greater than zero,
  calculating cluster cost in proportion to remaining datastore utilized-storage costs, and
  calculating the datastore total cost based on the cluster cost; and for each datastore,
 calculating datastore-base rate as the datastore total cost divided by the datastore utilized-storage capacity.

21. The non-transitory computer-readable medium of claim 17, wherein calculating the datastore-base rate further comprises for each datastore hosted by a single LD, assigning the LD-base rate of the single LD to the datastore-base rate.

22. The non-transitory computer-readable medium of claim 17, wherein calculating the datastore-base rate further comprises for a datastore host by two more LDs, calculating the datastore-base rate as a weighted averaged of LD-base rates of the two or more LDs.

23. The non-transitory computer-readable medium of claim 17, wherein calculating the datastore-base rate further comprises two or more datastores hosted by one LD, assigning the LD-base rate to each of the two or more datastores.

24. The non-transitory computer-readable medium of claim 17, wherein calculating the VM storage cost further comprises:

for each VM in the virtual data center,
 if the VM is hosted by one datastore,
  calculating the VM storage cost as a product of an amount of storage in the datastore utilized by the VM and the datastore-base rate; and
 if the VM is hosted by two or more datastores,
  for each datastore that hosts the VM, calculating a VM storage cost as a product of an amount of storage utilized by the VM and the datastore-base rate, and
 summing the VM storage costs to obtain a total VM storage cost.

* * * * *